(12) United States Patent
Bowles et al.

(10) Patent No.: US 9,457,644 B2
(45) Date of Patent: Oct. 4, 2016

(54) CONVERTIBLE ASSEMBLIES FOR VEHICLES

(71) Applicant: Webasto-Edscha Cabrio GmbH, Stockdorf (DE)

(72) Inventors: Jason Bowles, Owosso, MI (US); Magnus Sviberg, Deggendorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 26 days.

(21) Appl. No.: 14/523,020

(22) Filed: Oct. 24, 2014

(65) Prior Publication Data

US 2015/0115646 A1    Apr. 30, 2015

Related U.S. Application Data

(60) Provisional application No. 61/895,966, filed on Oct. 25, 2013.

(51) Int. Cl.
*B60J 7/12*    (2006.01)

(52) U.S. Cl.
CPC .............. *B60J 7/1265* (2013.01); *B60J 7/12* (2013.01)

(58) Field of Classification Search
CPC .................................. B60J 7/1265; B60J 7/12
USPC ..................... 296/107.09, 114, 116
See application file for complete search history.

(56) References Cited

U.S. PATENT DOCUMENTS

| | | | |
|---|---|---|---|
| 4,828,317 A * | 5/1989 | Muscat | B60J 7/1286 296/107.07 |
| 6,971,705 B2 | 12/2005 | Nania | |
| 7,740,302 B2 * | 6/2010 | Heselhaus | B60J 7/20 296/107.01 |
| 7,857,373 B2 * | 12/2010 | Dilluvio | B60J 1/14 296/107.09 |
| 8,272,677 B2 | 9/2012 | Nania | |
| 8,474,899 B2 * | 7/2013 | Moran | B60J 7/12 296/100.18 |
| 2003/0042751 A1 * | 3/2003 | Antreich | B60J 7/146 296/107.17 |
| 2003/0052507 A1 * | 3/2003 | Obendiek | B60J 7/1265 296/107.01 |
| 2004/0056506 A1 | 3/2004 | Nania | |
| 2005/0134096 A1 * | 6/2005 | Fallis | B60J 7/0053 296/218 |

FOREIGN PATENT DOCUMENTS

| | | |
|---|---|---|
| DE | 19752068 A1 | 5/1999 |
| DE | 19934673 C1 | 1/2001 |
| DE | 10039220 A1 | 2/2002 |
| DE | 10343128 A1 | 6/2004 |

* cited by examiner

*Primary Examiner* — Jason S Morrow
*Assistant Examiner* — E Turner Hicks
(74) *Attorney, Agent, or Firm* — Fitch, Even, Tabin & Flannery LLP

(57) ABSTRACT

A convertible top for a vehicle includes a convertible top assembly having a pivotally interconnected link arrangement between a forward assembly and an aft assembly. The forward assembly is configured to pivotally move relative to the vehicle framework and the aft assembly from a closed position to a first retracted position. The aft assembly is configured to pivotally move relative to the vehicle framework and the forward assembly from the first retracted position to a lowered storage position. Methods for opening the convertible top assembly are also provided.

17 Claims, 33 Drawing Sheets

CONVERTIBLE ASSEMBLIES FOR VEHICLES

CROSS-REFERENCE TO RELATED APPLICATIONS

This application is a U.S. Non-Provisional patent application of U.S. Provisional Patent Application Ser. No. 61/895,966, filed on Oct. 25, 2013, and entitled "CONVERTIBLE ASSEMBLIES FOR VEHICLES". The priority of the prior application is expressly claimed, and the disclosure of this prior application is hereby incorporated by reference in its entirety.

FIELD

Described herein are assemblies to deploy a convertible top for a vehicle, and particularly assemblies to retract a convertible top from a closed position, to a first retracted position and to a second retracted position using a plurality of pivoting armatures having a plurality of transverse tensioning bows.

BACKGROUND

Soft tops for convertible vehicles are known in the art. Typically, an outer convertible soft top fabric may be stretched over a plurality of linkage parts. The linkage parts form a roof framework over the interior of the vehicle when in a closed (extended) position. The roof framework is displaceable between the closed position and an open (retracted/stowed) position, where all or a portion of a vehicle passenger compartment is exposed. In the open position, the soft top and roof framework can be stowed in a portion of the vehicle bodywork provided therefor at the rear of the vehicle. One example of such framework is generally described in U.S. Pat. No. 8,272,677, the specification of which is incorporated herein by reference.

Also known in the art are tensioning bows, which form a portion of the plurality of linkage parts forming the framework. Tensioning bows ensure sufficient tension of the convertible soft top fabric in the closed position of the convertible top. Typically, a tensioning bow can be fixed to a portion of the convertible top fabric and tensions the convertible top fabric to provide appearance, aerodynamics and weather management comparable to a hard topped vehicle. Generally, tensioning bows are connected at their ends to main bearing units of the convertible top linkage assembly arranged respectively to the side or connected to further linkage elements of the convertible top and is forcibly guided in its motion by a mechanical coupling to parts of the convertible top linkage.

SUMMARY

Described herein are assemblies to deploy a convertible top for a vehicle, and particularly assemblies to retract a convertible top from a closed position to a first retracted position and a second retracted position using a plurality of pivoting armatures having a plurality of transverse tensioning bows.

In one embodiment, a convertible top for a vehicle having longitudinal vehicle frame members on both vehicle sides includes a convertible top assembly having a link arrangement pivotally mounted on each longitudinal frame member. Each link arrangement has a forward assembly pivotally mounted to an aft assembly. The aft assembly is pivotally mounted to the longitudinal vehicle frame members. Each forward assembly has a forward base bar pivotally mounted to a forward second bar to permit movement of a portion of the convertible top from a closed position to a first retracted position and the forward second bar is configured to fold over the forward base bar. Each aft assembly has a first pivotal mount to the forward base bar and a second pivotal mount to the longitudinal vehicle frame members. The first and second pivotal mounts permit movement of the link arrangements from the first retracted position toward a lowered storage position and the first pivotal mount and the second pivotal mount each comprise joint arrangements to couple the forward and aft assemblies to the longitudinal vehicle frame members.

The link arrangements may be connected by at least one tensioning bow.

In one approach, the forward assembly base bar are stationary during the movement of the convertible top from the closed position toward the first retracted position and the link arrangements controllably rotate from the first retracted position to the lowered storage position without extending beyond a vertical plane passing through a rear portion of the vehicle.

The forward assembly base bar may be configured to travel up to a five degree variation from a horizontal position while the link arrangements controllably rotate from the first retracted position to the lowered storage position.

The convertible top may, in one approach, include a floating tensioning bow disposed between a forward assembly tensioning bow and an aft end of the convertible top.

In one embodiment, each forward assembly includes eight bars pivotally connected by ten pivot points. The joint arrangements of the first and second pivotal mounts of the aft assembly each may have first and second aft bars between the first pivotal mount and the second pivotal mount coupled to three linked control bars and seven pivot points.

The pivot points may be configured so that four of the bars are substantially parallel to each other and four bars are substantially parallel to each other during the movement of the convertible top from the closed position toward the first retracted position. Each forward assembly may be configured to pivot at least 160 degrees during the movement of the convertible top from the closed position toward the first retracted position.

In one approach, each of the forward base bars includes a distal end including a pivot point removably attached to a forward edge of a vehicle roof opening, wherein the distal end of each of the forward base bars is connect by a forward connector.

The forward assembly may further comprise a plurality of transverse tensioning bows such that a distance between each of the plurality of transverse tensioning bows of the forward assembly in the first retracted position is configured according to a formula of $(N_{(A \ldots D)}/2)-K$, where N is a distance between a pair of the transverse tensioning bows in the closed position and K is a constant. K may be about 8 to 14 (e.g., 8 to 14) percent of the value of N. K may also be a rising constant that increases in an aft-ward longitudinal direction of the vehicle.

The aft end of the convertible top may further comprise a hatch bow pivotally mounted to and adjacent to an aft rear sill of the vehicle.

In one embodiment, a method of opening a convertible top of a vehicle is provided. The vehicle may have longitudinal vehicle frame members on two opposite sides of the vehicle, a link arrangement pivotally mounted on each of the longitudinal frame members, where: each link arrangement has a forward assembly pivotally mounted to an aft assembly; the aft assembly is pivotally mounted to the longitudinal vehicle frame members; each forward assembly has a forward base bar pivotally mounted to a forward second bar; each aft assembly has a first pivotal mount to the forward base bar and a second pivotal mount to the longitudinal vehicle frame members, and the first pivotal mount and second pivotal mount each have joint arrangements to couple the forward and aft assemblies to respective longitudinal vehicle frame members. The method may include folding the forward second bar over the forward base bar to adjust a portion of the convertible top between a closed position to a first retracted position; and retracting the link arrangements from the first retracted position toward a lowered storage position.

The method may further include raising a hatch bow pivotally mounted to and adjacent to an aft rear sill of the vehicle.

The method may further include moving at least one bar of the forward assembly by at least 160 degrees during the retracting of the link arrangements from the closed position toward the first retracted position.

In an embodiment, a convertible assembly for a vehicle having a soft top roof, a forward end, and an aft end is provided. The convertible assembly include a forward roof assembly and an aft roof assembly pivotably attached to opposite longitudinal vehicle frame members. The forward roof assembly is movable between a closed position which covers at least a portion of an interior of the vehicle and a retracted position which exposes at least a portion of the interior of the vehicle. The forward roof assembly includes a pair of reciprocal pivoting armatures extending longitudinally along at least a portion of the longitudinal vehicle frame members. The armatures are connected by a plurality of transverse tensioning bows. At least a first bar of the forward roof assembly has an extended position and is attachable to a portion of the vehicle when in the extended position. The aft roof assembly is pivotably attached to the forward roof assembly at a forward end of the aft roof assembly and is pivotably attached to the longitudinal frame members at an aft end of the aft roof assembly. The aft roof assembly is movable between a closed position which covers at least a portion of the interior of the vehicle and a retracted position which exposes the interior of the vehicle. The aft roof assembly includes a pair of reciprocal pivoting armatures extending longitudinally along a length of a portion of at least a portion of the longitudinal vehicle frame members.

The forward roof assembly may be configured to pivot at least 160 degrees during the movement of the forward roof assembly from the closed position toward the first retracted position.

A distance between each of the plurality of transverse tensioning bows of the forward assembly in the first retracted position is configured according to a formula of $(N_{(A...D)}/2)-K$, where N is a distance between a pair of the transverse tensioning bows in the closed position and K is a constant.

In some sectional views above, cross-hatching has been omitted for clarity purposes.

DESCRIPTION

In convertible vehicles, armature assemblies are used to open and retract a convertible top. The armatures are typically configured to direct a convertible roof between fore (closed) and aft (opened/stowed) positions relative to a vehicle centerline and are arranged in left/right pairs. It is noted that in the following descriptions, when a retraction or opening sequence are described, it is understood that the opposite sequence of opening and retraction are also possible. Also, it is noted that the kinematics of the armature assembles described herein are essentially configured in left/right pairs of each other (in other words mirror images of each other). Further, transverse bows typically connect the armature pairs to form a roof shape, support and framework for a vehicle soft-top in the closed position. Kinematics are also typically provided to open and close the soft top. Also, configurations for storage of the soft top and framework, including the tensioning bows are also possible.

The present embodiments provide armatures for convertible vehicle soft tops using a plurality of transverse tensioning bows. At least two retraction sequences are provided. The first retraction sequence provides for retraction of a portion of the vehicle roof to expose a portion of the passenger compartment. As shown, for example, in FIGS. 3-9 and discussed in more detail below, the first retraction sequence provides for retraction of the soft top to open the forward passenger compartment of the vehicle and the vehicle could operate with the soft top in this first retracted position. A second retraction sequence provides for retraction of the convertible soft top to expose a greater portion of the passenger compartment including, according to one approach, the rear passenger compartment. As shown, for example, in FIGS. 10-12 and discussed in more detail herein, this resultant second retracted position exposes the front and rear passenger compartment as well as all or a portion of the rearward storage area of the vehicle behind the passenger seats. A third retraction sequence shown in FIGS. 13 and 14 and discussed in more detail below allows for a retraction of a portion of the roof beginning at the aft end of the vehicle and retractable to expose a portion of the rearward portion of the vehicle. The present embodiments are suited for various vehicles configured for utilitarian use. Such vehicles may have bodies that include roll cages and bars, rather than a typical vehicle body-in-white having center-posts and roof. In these types of vehicles, roofs can be fairly planar or flat and generally extend from a forward or fore end 23 of a passenger compartment or interior of the vehicle 10 to the rearward or aft end 25 of a vehicle 10, as shown, for example, in FIG. 2.

Figure 2:
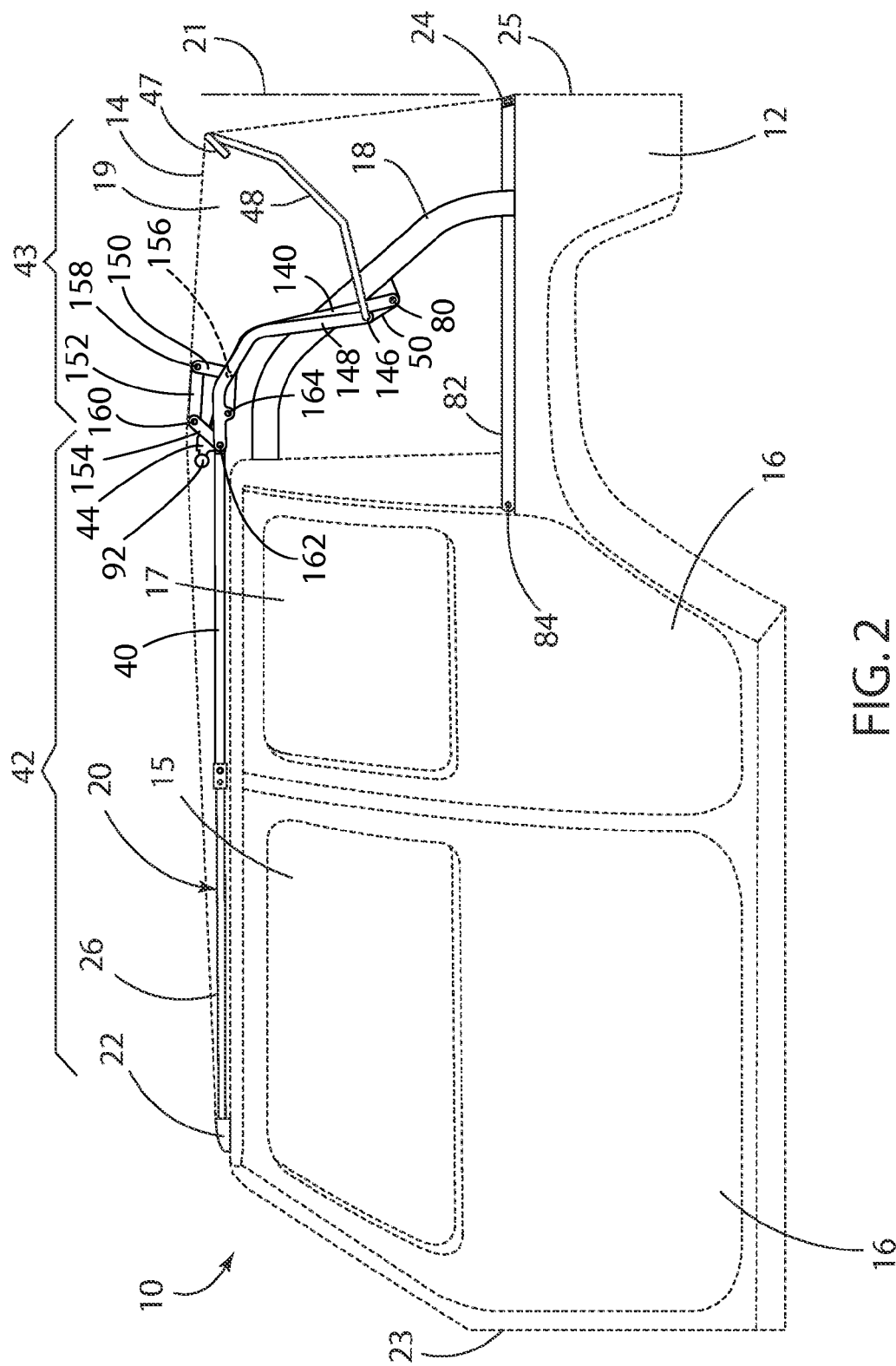
FIG. 2 is a side sectional view of a vehicle, taken along a section line similar to section lines XXVIII-XXVIII of FIG. 23, illustrating a framework for an assembly according to one approach.
Figure 26:
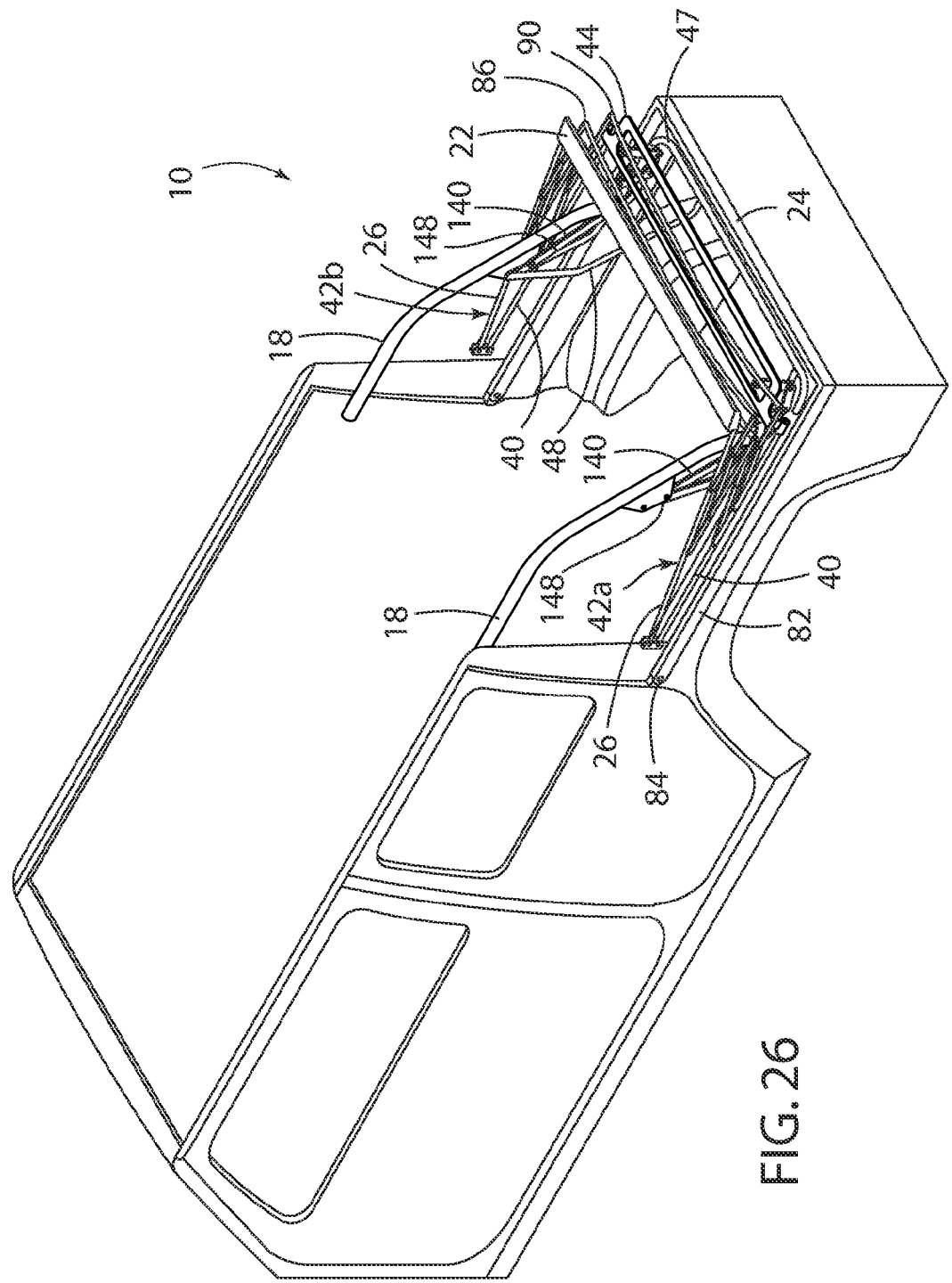

Advantageously, described herein are exemplary embodiments of convertible framework assemblies to retract and extend a convertible portion of a vehicle soft top for vehicles using a pair of pivoting armatures connected by a plurality of transverse tensioning bows. The convertible framework assemblies according to the present embodiments are retractable from a closed position to a first (partially) retracted position to open a portion of a vehicle roof to expose a smaller portion of the passenger compartment including the front passenger seats, and a second (fully) retracted position to expose a larger portion of the passenger compartment including, for example, at least the front and rear passenger seats. Such assemblies can be configured for attachment on vehicles where the convertible top can be retracted to its aft end 25, such as shown in FIGS. 2 and 26. The assemblies can also be configured to attach to vehicle structural frames, such as vehicles with fore and aft roll bars, or other similar framing configurations defining a passenger compartment of the vehicle.

Figure 3:
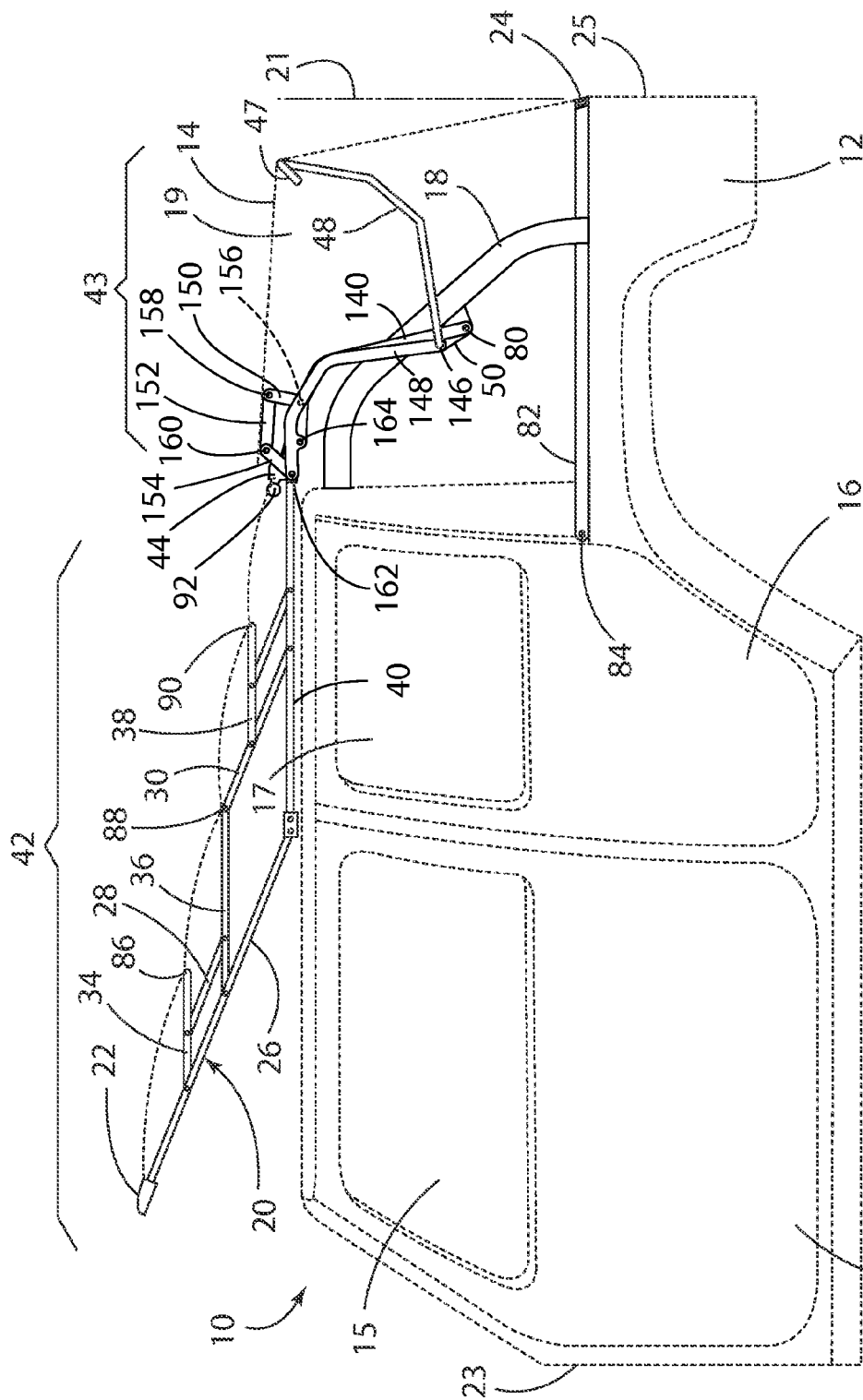
FIGS. 3-9 illustrate a sequence of side sectional views of the framework of FIG. 2 during retraction of the forward assembly from an extended position shown in FIG. 3 to a first retracted position shown in FIG. 9.
Figure 9:
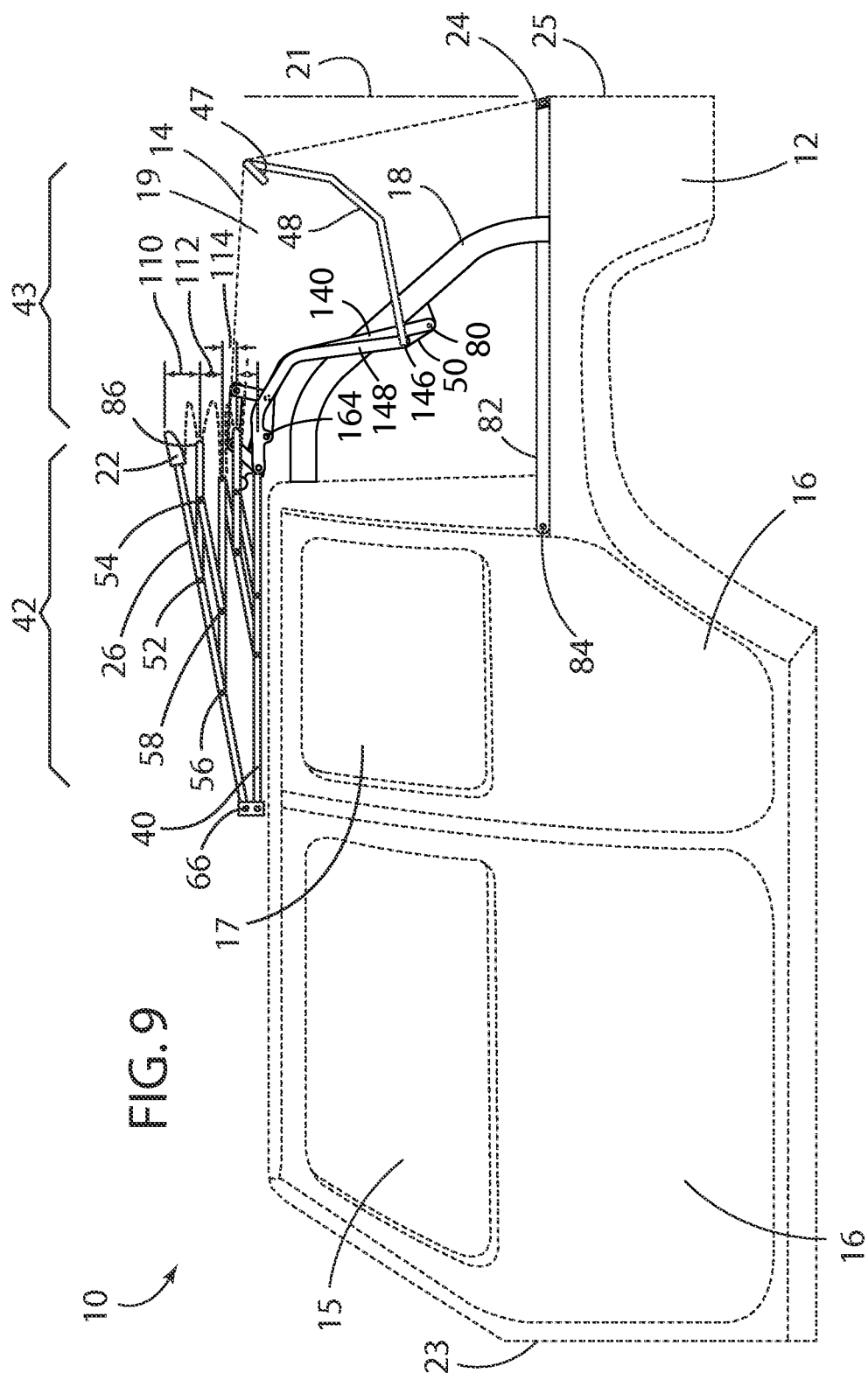

Turning now to the figures, in one embodiment depicted in FIGS. 2-12, an integrated assembly having a first forward assembly 42 and a second aft assembly 43 is shown. The first forward pivoting armature or forward assembly 42 can retract a convertible top 14 of a vehicle 10 having doors 16 to partially open the vehicle roof, as shown, for example, in FIG. 9. The convertible top 14 of the vehicle 10 can be retracted to a first retracted position shown in FIG. 9, which opens a portion of the roof of vehicle 10 for, by way of illustration, the passengers in the front seats of the passenger compartment of the vehicle 10. During the opening sequence shown in FIGS. 2-9 from the closed/stowed position of FIG. 2 to the first retracted position of FIG. 9, the forward assembly 42 allows for up to 180 degree aft-ward rotation of the soft top 14 during its travel from the closed position of FIG. 2 to the first retracted position of FIG. 9 to reduce wind drag and vehicle height while the vehicle 10 is in motion. As shown in FIG. 9, with the forward assembly 42 being in the exemplary first retracted position, forward second bar 26 has rotated approximately 160 to 170 degrees relative to its orientation when in the partially opened position of FIG. 3, such that the angle between forward second bar 26 and forward base bar 40 of the forward assembly 42 in the position shown in FIG. 3 is approximately 10 to 20 degrees.

It is noted that in the forward assembly 42, bar 40 is a forward base bar and is stationary during the rotation of forward assembly 42 and serves as a base point of attachment to aft assembly 43 described below. It will be appreciated that the degree of rotation of forward second bar 26 relative to forward base bar 40 is preferably more than 160 degrees such that the forward second bar 26 may fold over the forward base bar 40 and may overlie at least a portion of the base bar 40, and such that the angle between bar 26 and bar 40 may be less than 20 degrees. In one preferred embodiment, the angle between bar 26 and bar 40 may be between about 13 to 17.5 degrees (e.g., 13 to 17.5 degrees), and more preferably, may be about 17.5 degrees (e.g., 17.5 degrees). It is to be appreciated that the figures are not intended to be drawn to scale and the angles between bars 26 and 40 are exemplary points during the rotation of bar 26 from the closed position of the forward assembly 42 shown in FIG. 2 to the first retracted position of the forward assembly 42 shown in FIG. 9.

Figure 10:
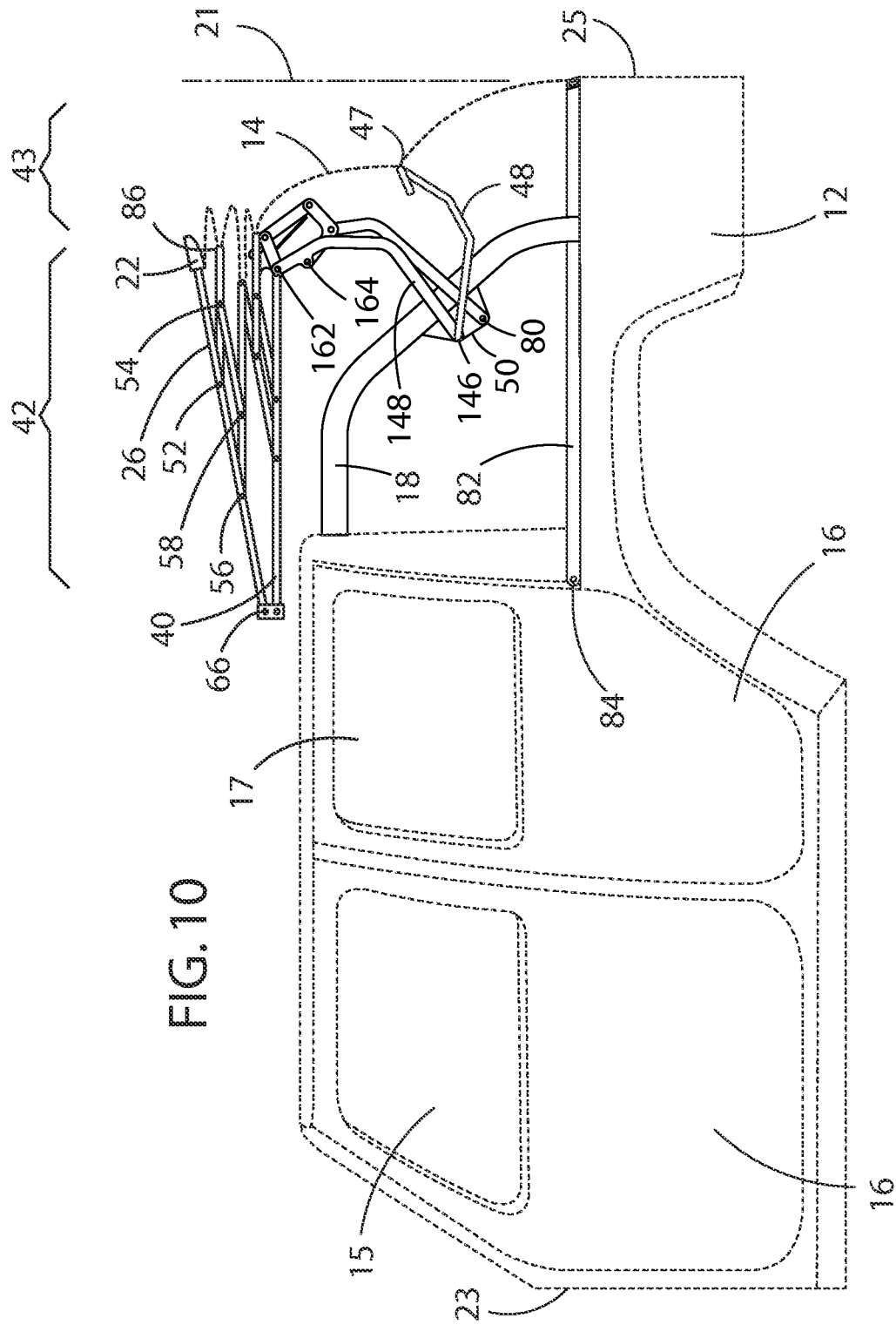
FIGS. 10-12 illustrate a sequence of side sectional views of the framework of FIG. 2 during retraction of the aft assembly from the first retracted position shown in FIG. 9 to a second retracted position shown in FIG. 12.
Figure 11:
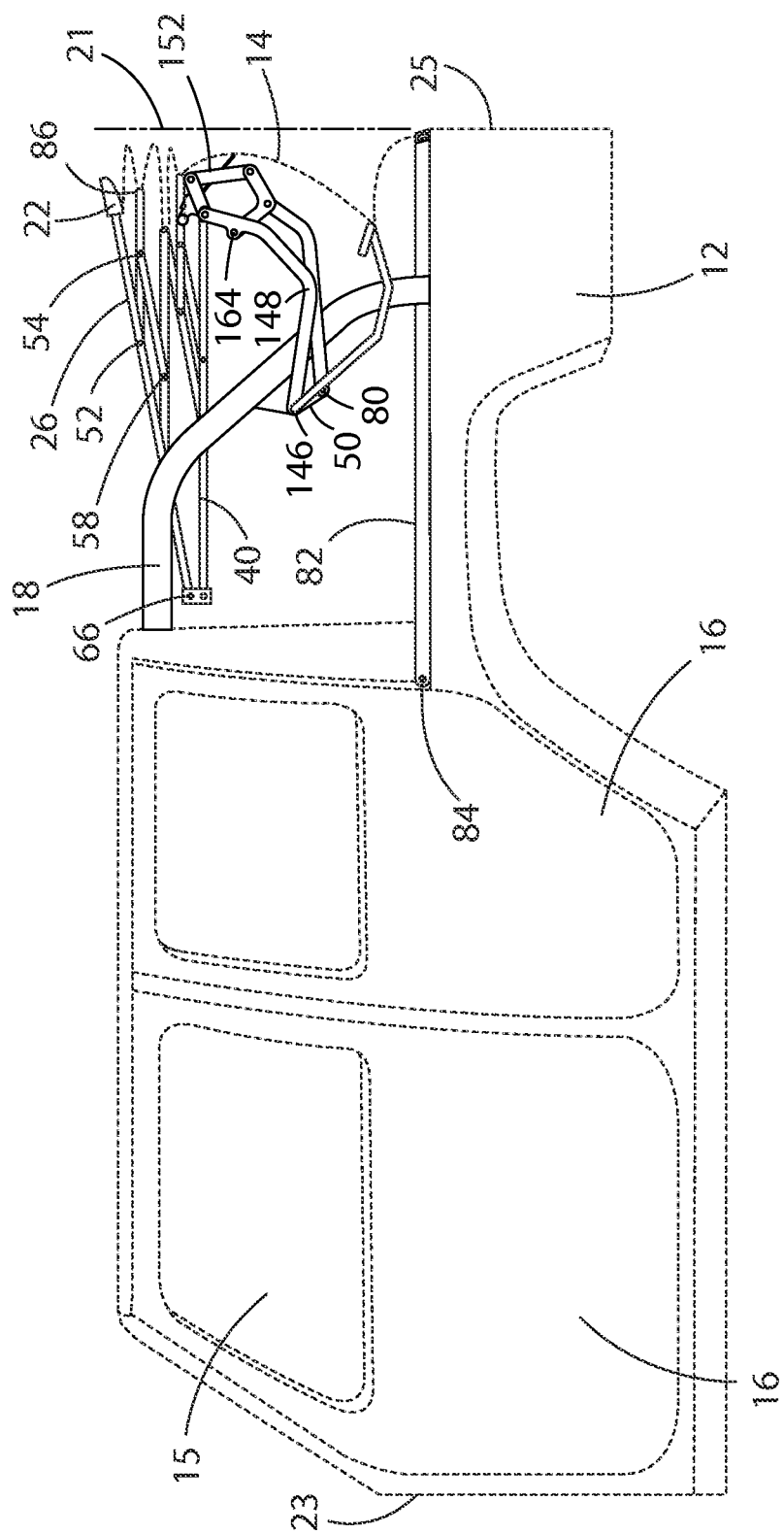
Figure 12:
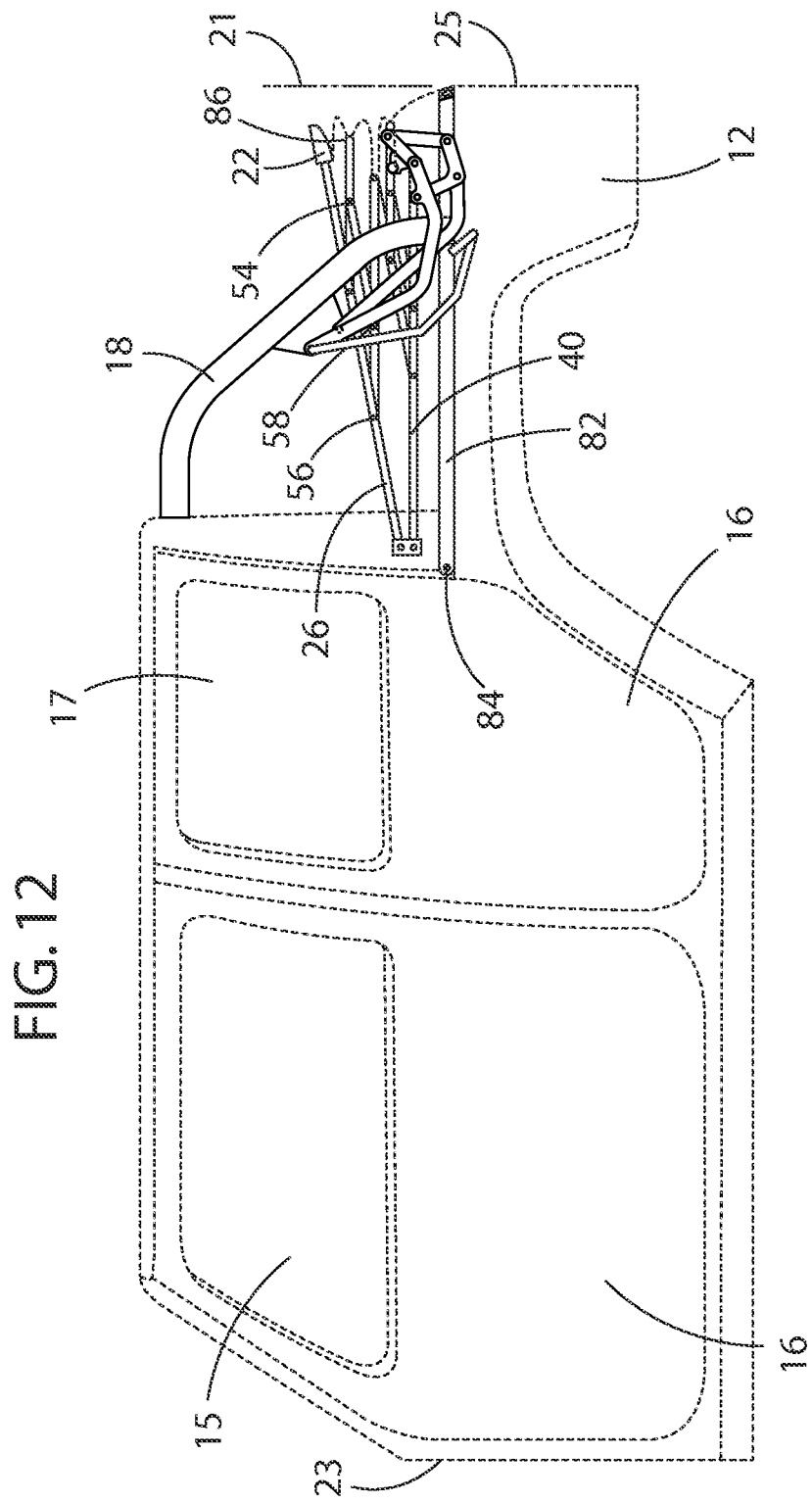

In another approach, forward assembly 42 may be oriented in a partially open position such that an angle of less than 12 degrees (e.g., less than 10 degrees or less than 5 degrees) is formed between bar 26 and bar 40 even with the four tensioning bows (86, 88, 90 and 92, shown in FIG. 8) being present. Using this compact design, further retraction of the forward assembly 42 and the aft assembly 43 is possible such as shown in FIGS. 10-12 to fully open and stow the convertible soft top 14 and forward and aft assemblies 42 and 43 all the way to the aft end 25 of the vehicle 10, such as shown in FIG. 12. In one approach, optional tensioning bows 86 and 90 and their respective connecting bars 28 and 32 allow for the more consistent, compact, and even folding of the soft top 14 during retracting and stowage in its open position.

Figure 4:
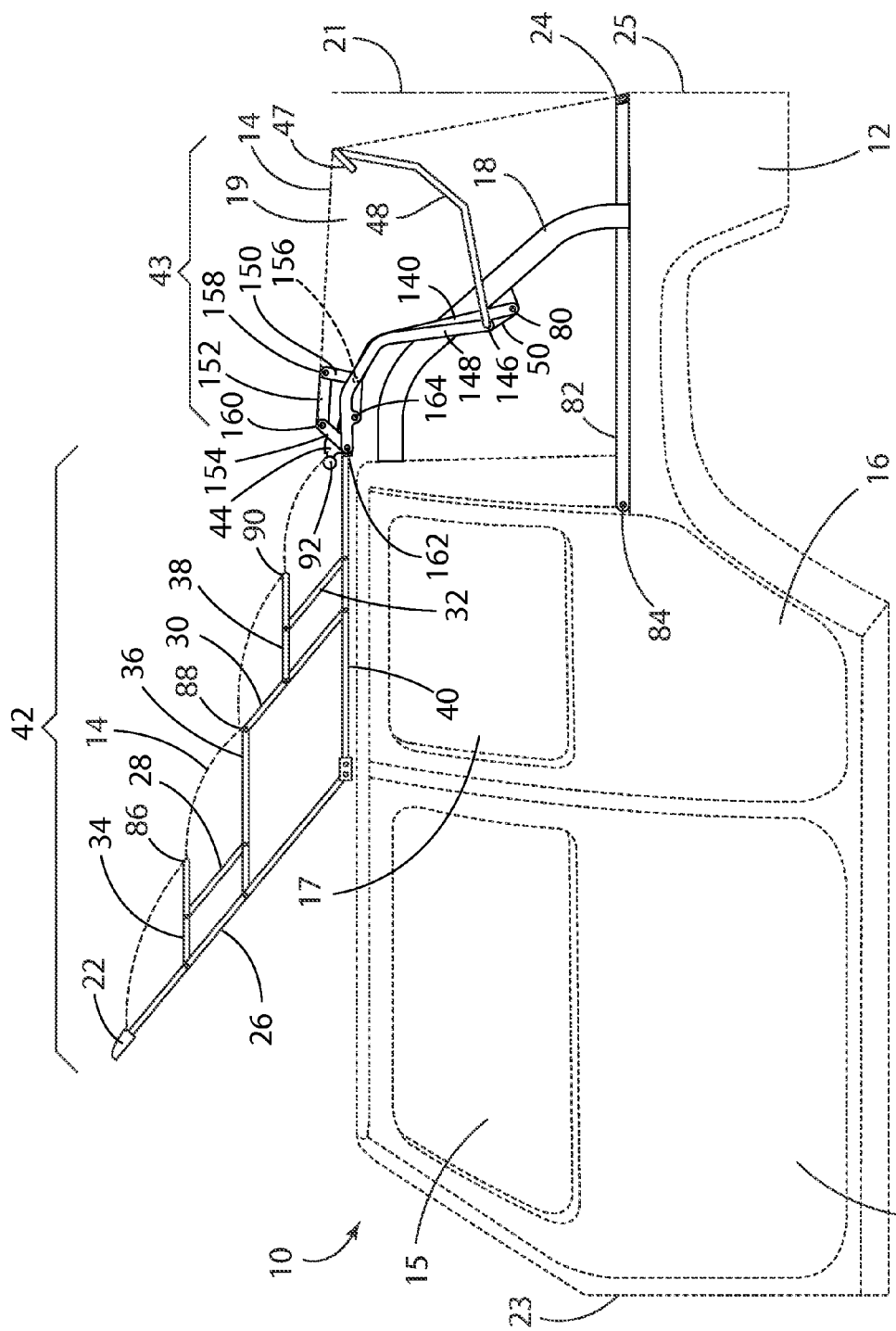
Figure 5:
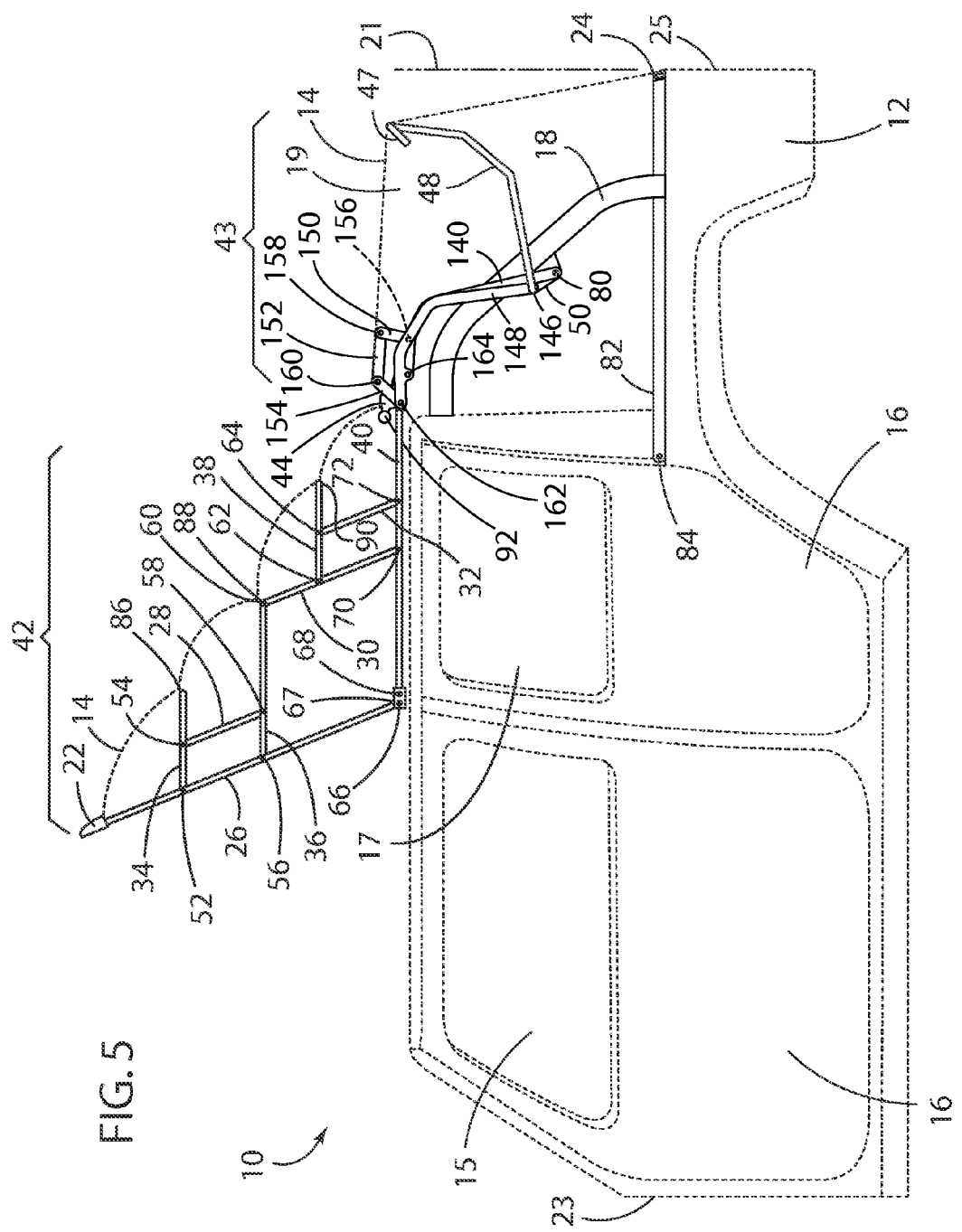

In the exemplary embodiment shown in FIGS. 2-12, the forward assembly 42 is configured as a kinematic assembly including eight bars 26, 28, 30, 32, 34, 36, 38 and 40, and ten pivot points 52, 54, 56, 58, 60, 62, 64, 66, 68, 70 and 72 at which some of the bars 26, 28, 30, 32, 34, 36, 38 and 40 are movably coupled to one another, as shown in more detail, for example, in FIGS. 4, 5, and 9. It will be appreciated that the number of bars and pivot points in the assembly 42 has been shown for illustration purposes only, and that the assembly 42 can have more or fewer bars and corresponding pivot points based on various convertible top 14 sizes or desired support.

As shown in FIG. 5, a bracket 67 may be used to contain pivot points 66 and 68. It is noted though that bracket 67 is optional and that pivot points 66 and 68 may be replaced by a single pivot point where the bar 26 and the bar 40 of the forward assembly pivotally couple (directly or indirectly) to each other. In the preferred embodiment, the length of the bars and location of their respective pivot points is chosen such that the bars 26, 28, 30 and 32 are oriented generally parallel (e.g., parallel to about 10 degrees off parallel) to each other through the duration of the travel of the forward assembly 42 from the closed position of FIG. 2 toward the first retracted position of FIG. 9. In the preferred embodiment, the length of the bars and location of their respective pivot points is chosen such that the bars 34, 36, 38 and 40 are oriented generally parallel (e.g., parallel to about 10 degrees off parallel) to each other through the duration of the travel of the forward assembly 42 from the closed position of FIG. 2 toward the first retracted position of FIG. 9.

Figure 6:
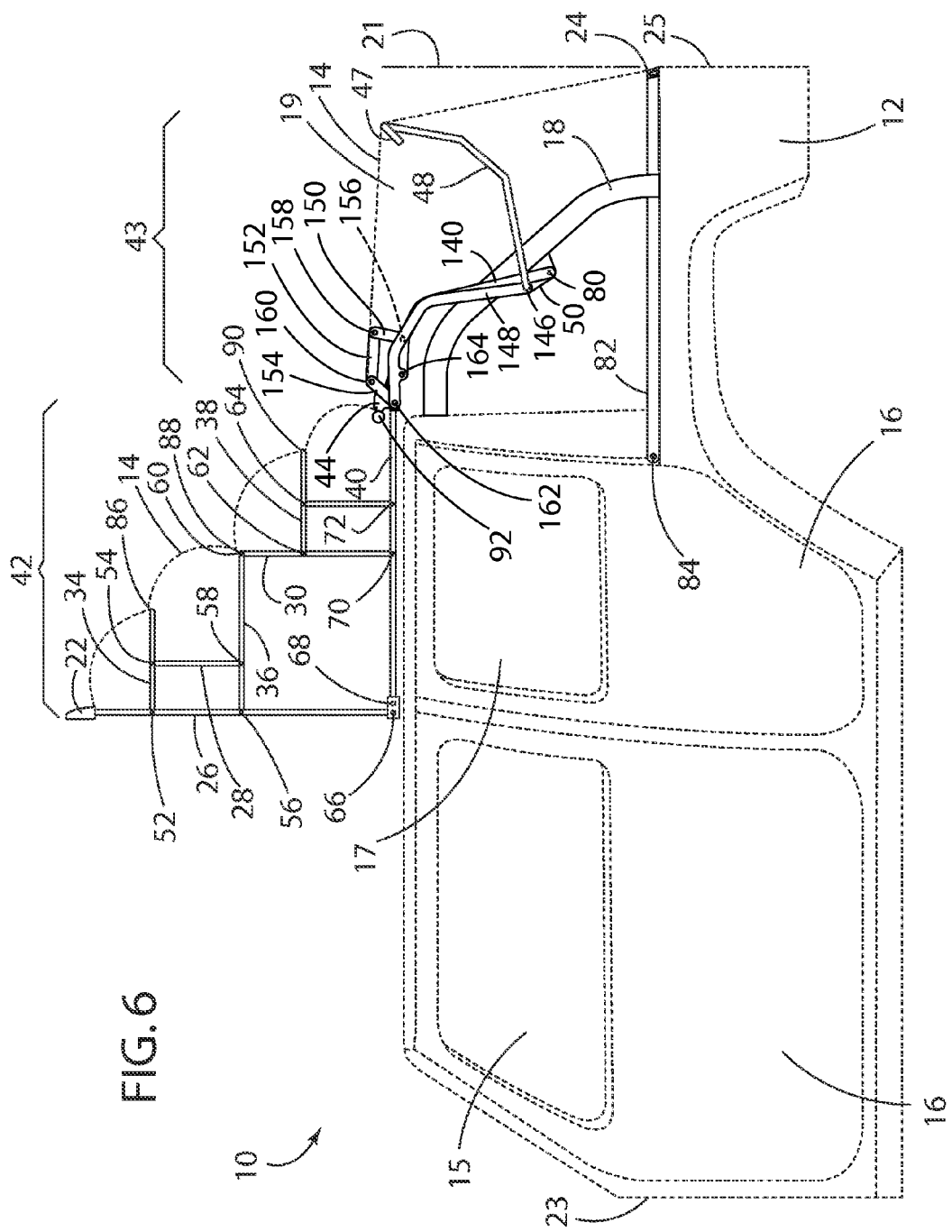
Figure 7:
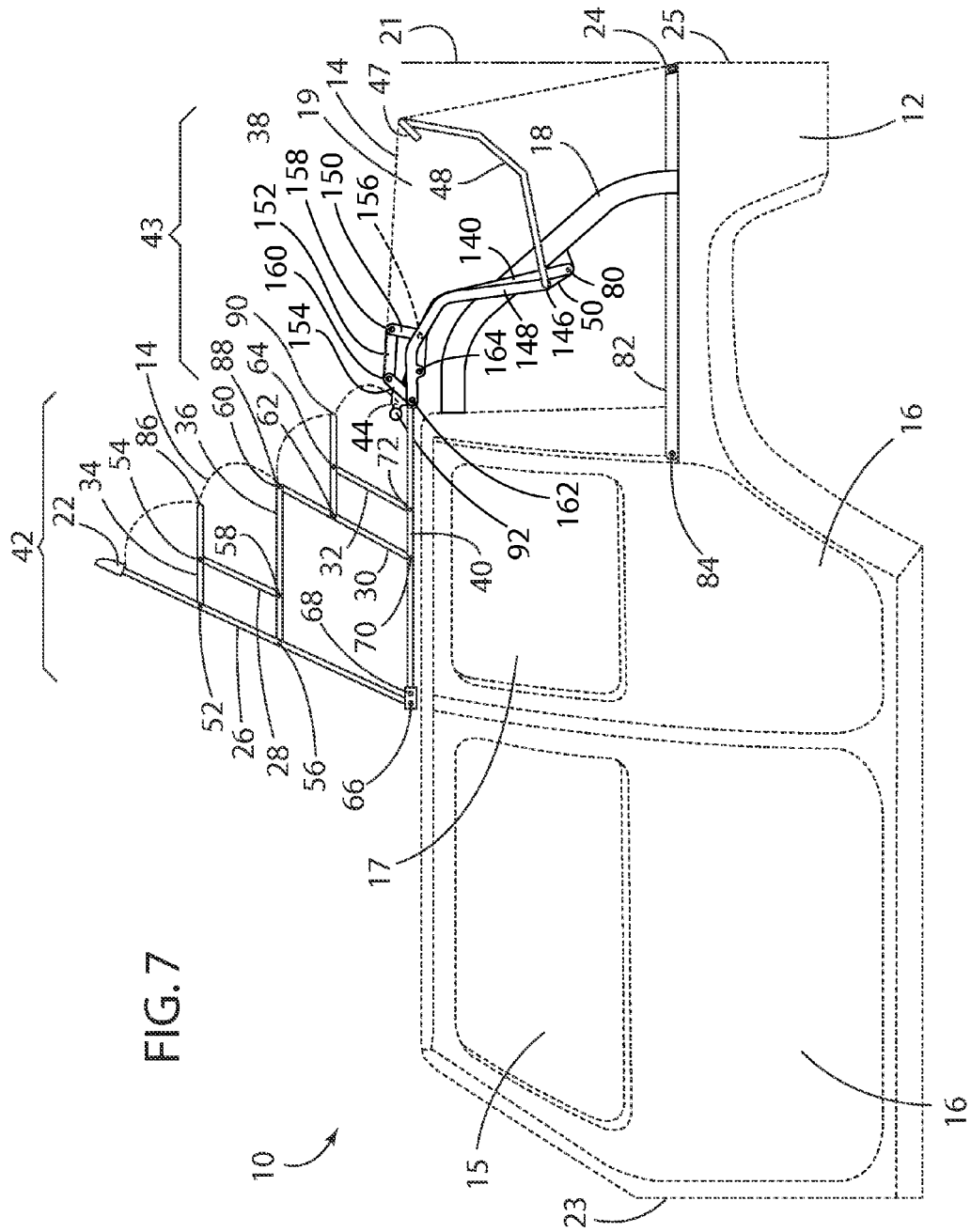
Figure 8:
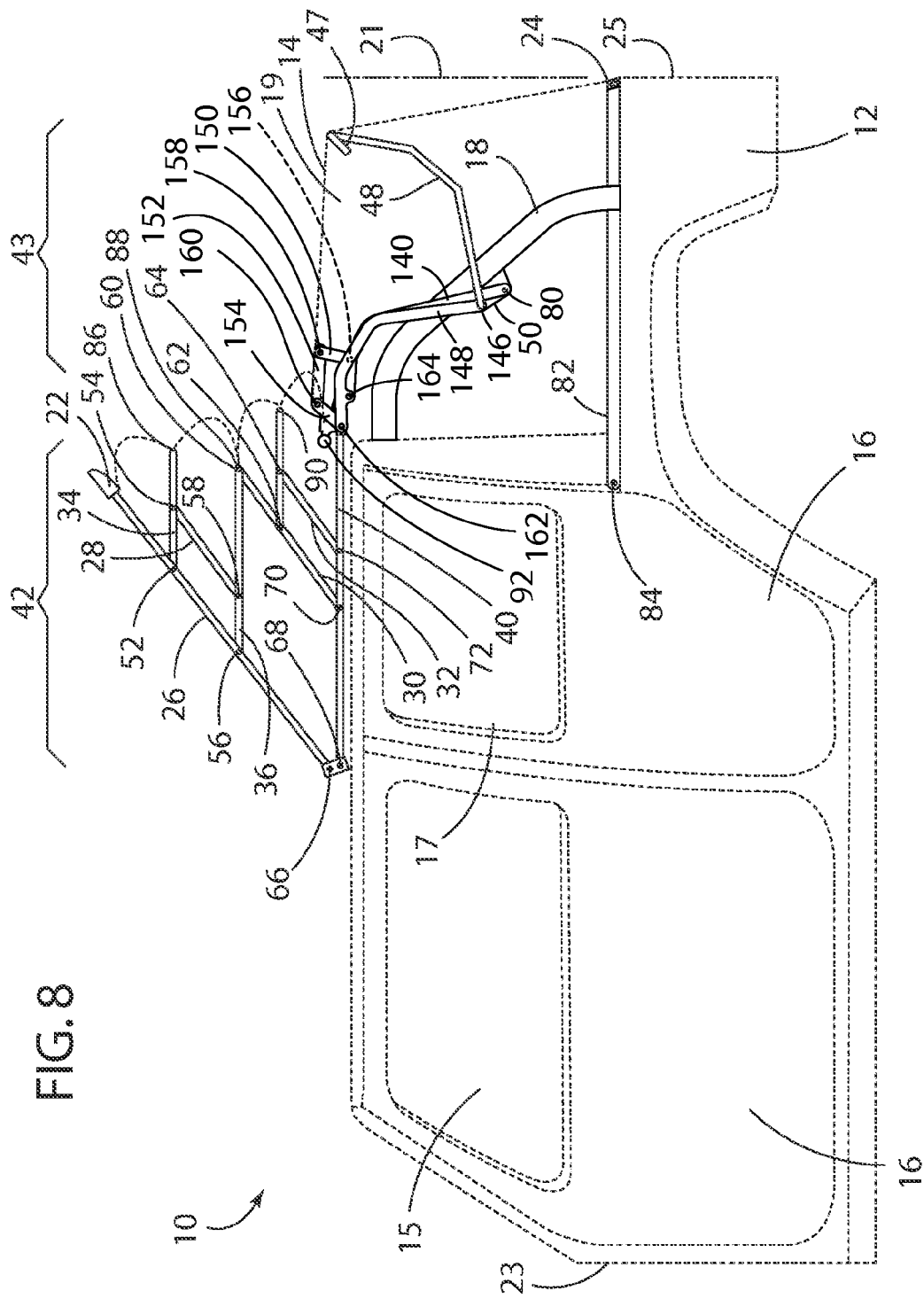

Given this configuration, when assembly 42 is approximately 90 degrees (e.g., exactly 90 degrees or 90 degrees plus or minus 5 degrees) through its travel from the closed position of FIG. 2 toward the first retracted position of FIG. 9, the bars 26 and 40 may be at right angles to each other, and bars 26, 28, 30 and 32 may be generally parallel to each other and at right angles (i.e., perpendicular) to bars 34, 36, 38, and 40, as shown in FIG. 6. In the preferred embodiment, the forward assembly 42 includes reciprocal assemblies 42a and 42b on each side of the longitudinal centerline of the vehicle 10, as shown, for example, in FIGS. 16-26. The two sets of reciprocal assemblies 42a and 42b may be mirror images of each other and are shown in the assembly opening sequence shown beginning at FIG. 16, and in more detail, in FIG. 20. Also, as shown in FIGS. 16-26, distal ends of bars 34, 36 and 38 of each reciprocal assembly 42a and 42b are connected by transverse tensioning bows 86, 88 and 90, respectively. Additionally in the embodiment shown in FIG. 20, forward connector 22 extends between the distal ends of the bars 26 of the assemblies 42a and 42b and interconnects the distal ends of the bars 26. It will be appreciated that the forward connector 22 may interconnect the distal ends of the bars 26 of the assemblies 42a and 42b directly, or via an intermediate coupling structure, for example, a bracket. Forward connector 22 may optionally have a latching mechanism to secure the front end of assembly 42 to the vehicle 10.

Forward and aft assemblies 42 and 43 (described below) can be configured from a variety of materials such as metal, composites, plastics and combinations thereof. Forward assembly 42 is preferably made from materials having the strength, rigidity, economy of production, and desired cooperation with other component parts. Tensioning bows 86, 88 and 90 can be configured as metal having a hollow cross-section. Other possible materials suitable for tensioning bows 86, 88, and 90 can include composites, fiberglass, plastics, polymers, combinations thereof, and the like. It will be appreciated that other support and/or securing features, such as channels, and the like can also be included to add strength or to provide fastening points to the soft top 14.

Figure 27:
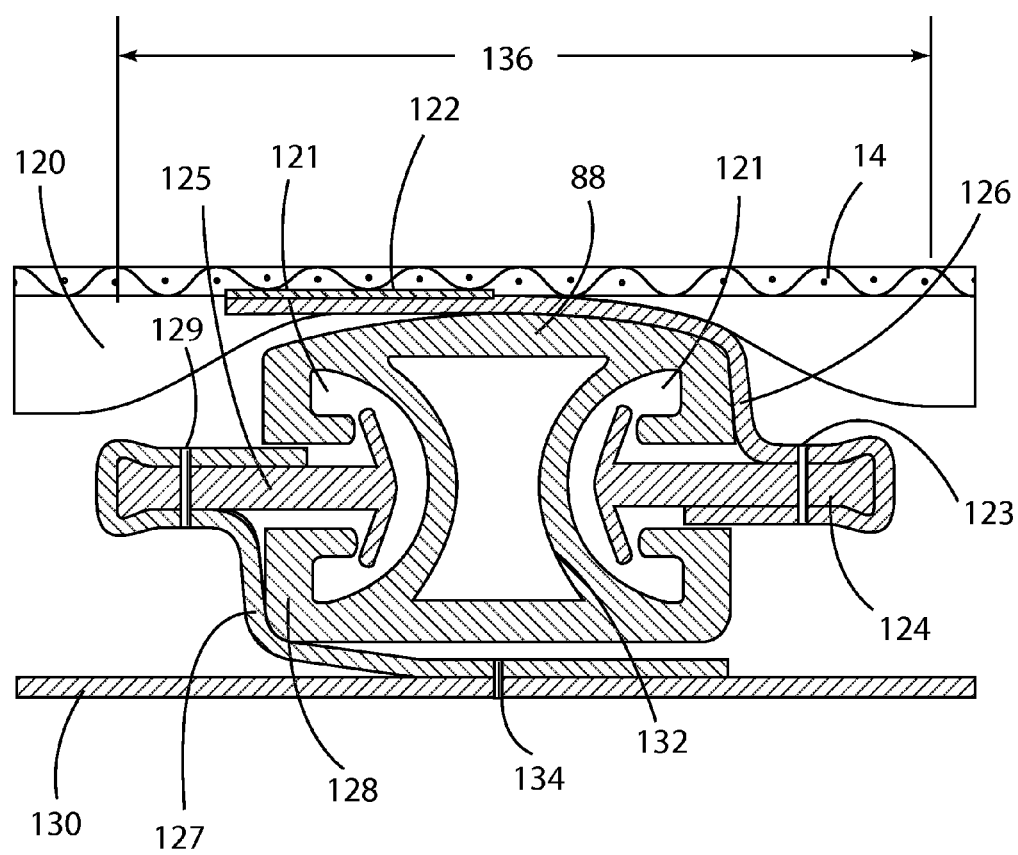
FIG. 27 illustrates an enlarged fragmentary sectional view of an exemplary bow and soft-top attachment taken along section lines XXVII-XXVII of FIG. 1.

In one approach, the fabric of soft top 14 of vehicle 10 is fixed to the bows (e.g., 22, 24, 47, 86, 88, 90, and 92) along the length of the bows. FIG. 27 shows a cross-sectional view taken along section lines XXVII-XXVII of FIG. 1 and shows an exemplary attachment of the soft top 14 to the bow 88. As shown in FIG. 27, the bow 88 is sandwiched between the soft top 14 and an insulation layer 120 on top and a headliner 130 below facing the vehicle interior. In the exemplary configuration shown in FIG. 27, bow 88 has a hollow core 132 and is connected to the soft top 14 by a top flag member 126. The first end of top flag member 126 can be, for example, attached to the soft-top 14 by a two-sided tape member 122.

In other embodiments, the flag member 126 can be bonded such as with adhesive or stitching (e.g., see fastener stitching 134) or even welded to the soft top 14. The exemplary arrangement as shown in FIG. 27 allows about a 10 degree roll in the soft top 14 as the soft top 14 retracts from the extended/closed position toward an opened/stowed position. An attachment clip 124 is fastened to a second end of flag 126 by a fastener 123. The fastener 123 can be of a variety of configurations such as stitching as shown at 123 in FIG. 27. In the exemplary approach shown in FIG. 27, the flag 126 is directed aft-ward from soft top 14 and the attachment clip 124 is configured to snap fit into a bow clip receiving channel 121. Bow 88 can be connected to headliner 130 in similar fashion. Headliner 130 is fastened to flag 127 by fastener 134 and is directed forward to attached bow 88 by clip 125 fastened by fastener 129 as shown in FIG. 27. Preferably, a width (dimension 136) and configuration of bow 88 (and all bows for that matter) does not exceed the space between the bows in their retracted position. The other bows (e.g., 90) can be attached to soft top 14 in similar fashion.

Movement of the assemblies 42 and 43 can be initiated by a variety of motive forces, such as electrical motors or user effort. Further, a forward-most portion or distal end of bar 26 (or the forward connector or forward bow 22) can have a fastening means (27) (FIG. 20) to provide for fastening of the convertible soft top 14 and assembly 42 to the vehicle 10. Optionally, other fastening points can also be included along the sides of the bodywork 12 of the vehicle 10 for weather management.

Figure 1:
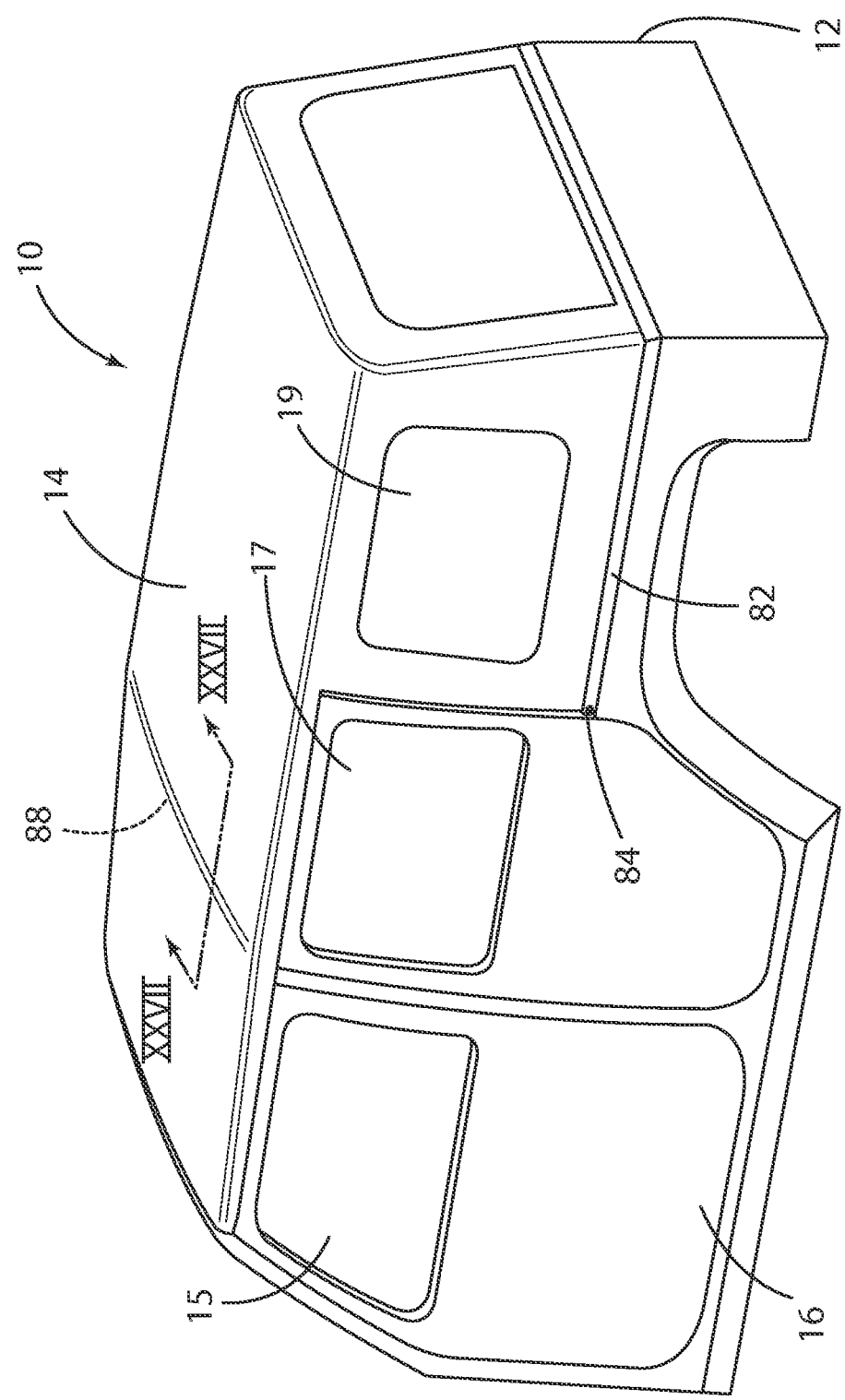
FIG. 1 is a perspective view of portions of bodywork of a vehicle suited for the assemblies of present embodiments having a soft top.
Figure 18:
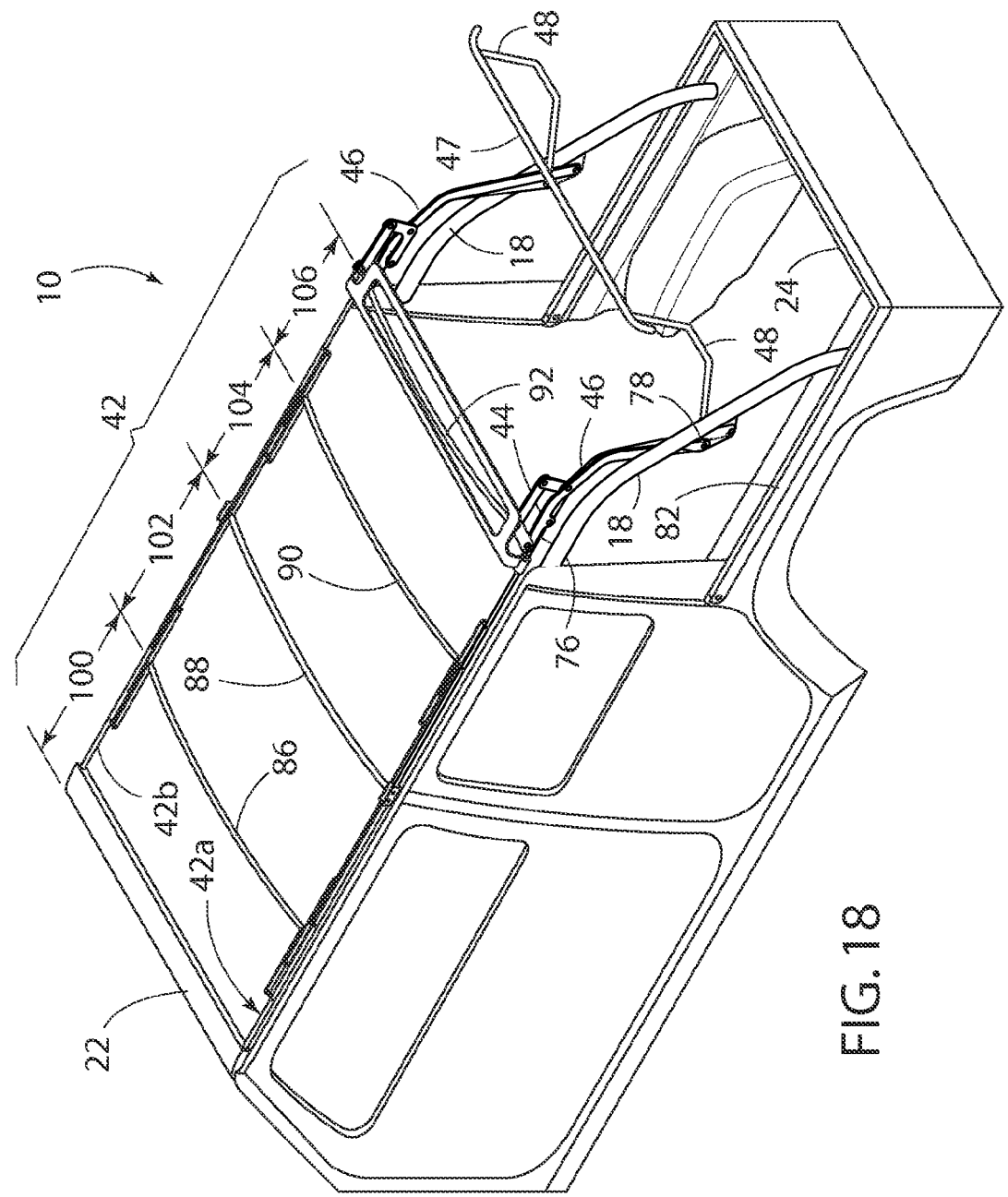
Figure 19:
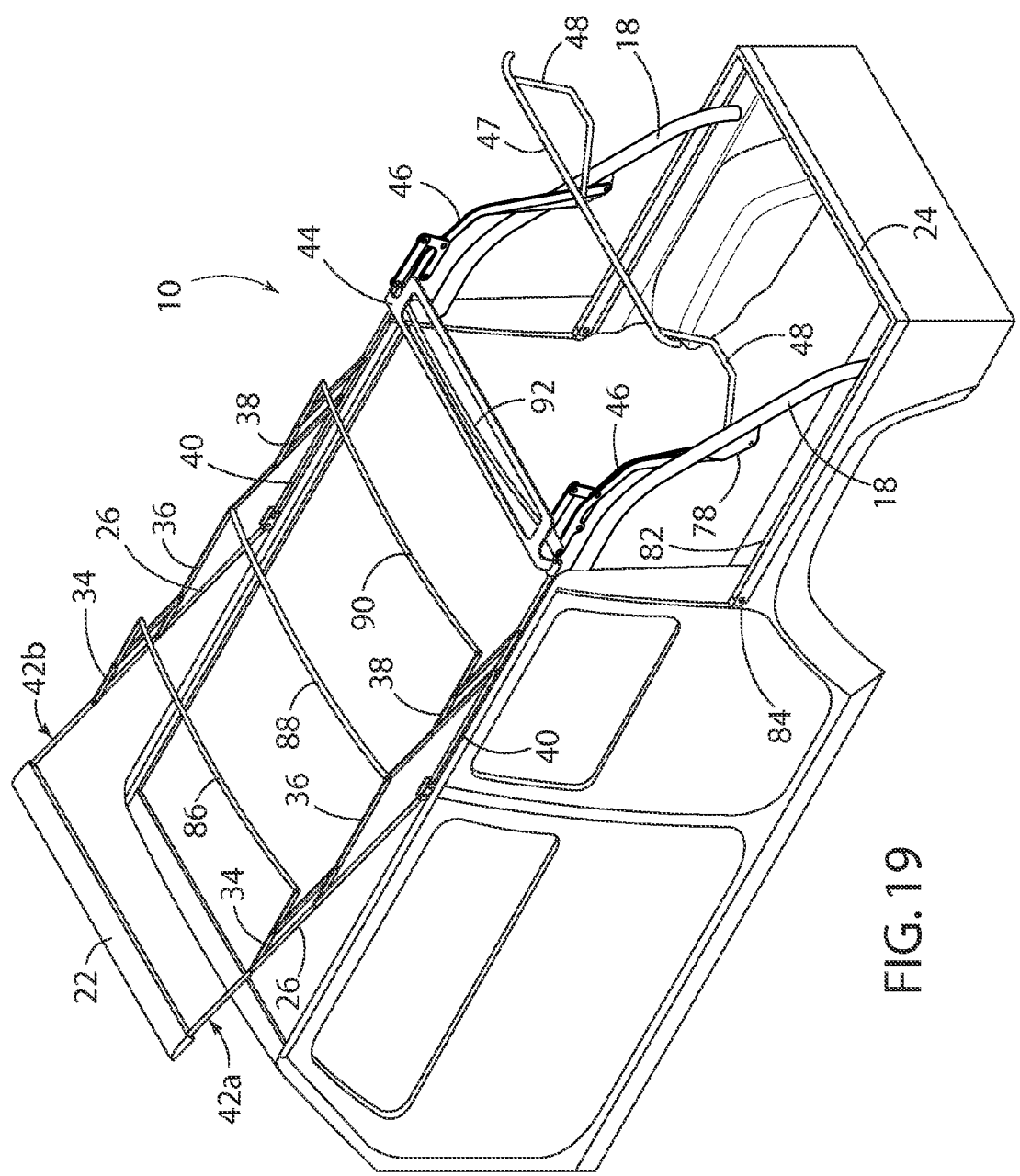
FIGS. 19-23 illustrate perspective views of the portions of the bodywork of the vehicle of FIG. 15 and the framework for the convertible assembly embodiment of FIG. 2 during the first retraction/opening sequence of the assembly beginning as shown in FIG. 19 from an extended/closed position shown in FIG. 18 to the first opened/retracted position shown in FIG. 23.
Figure 20:
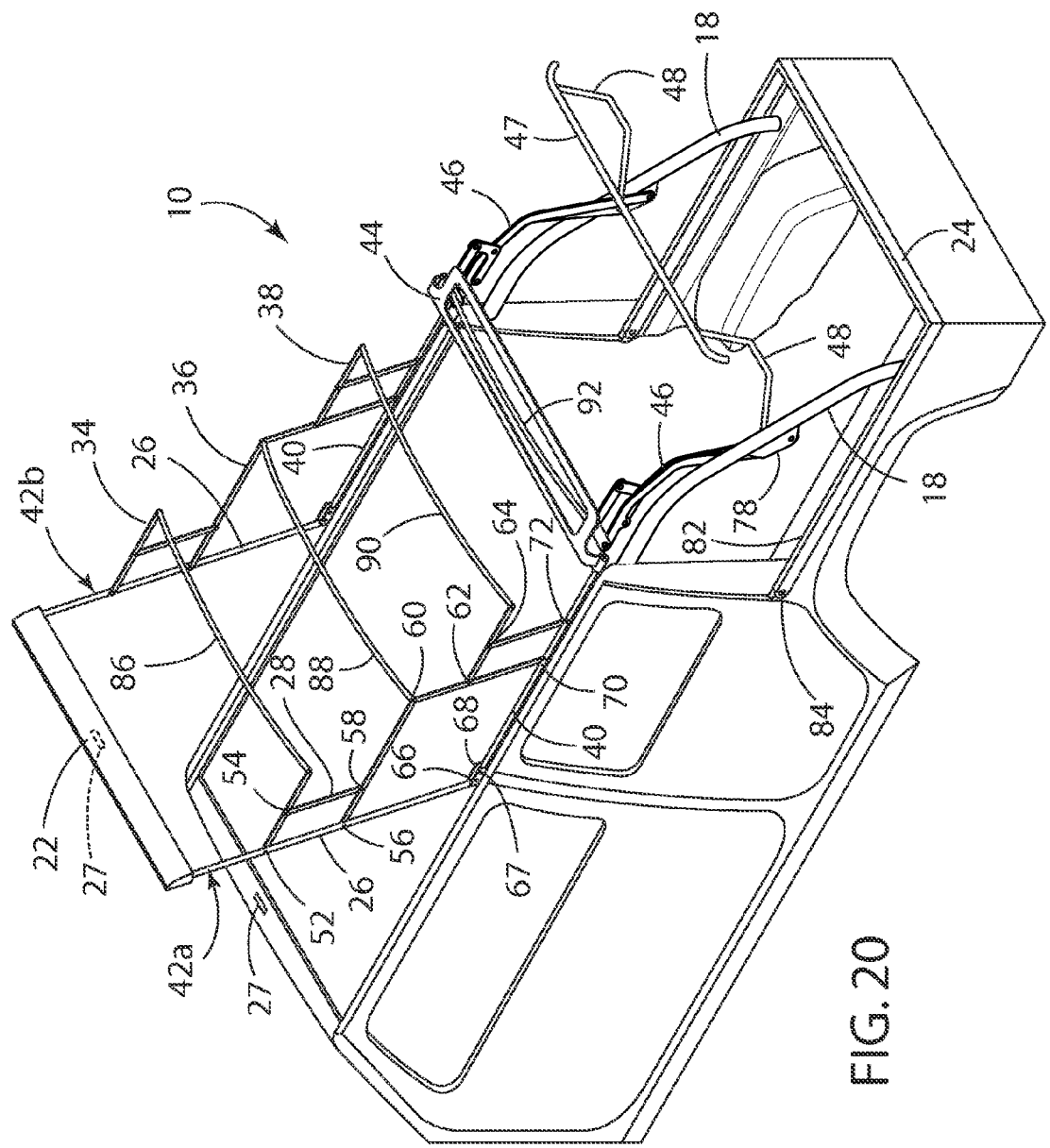
Figure 21:
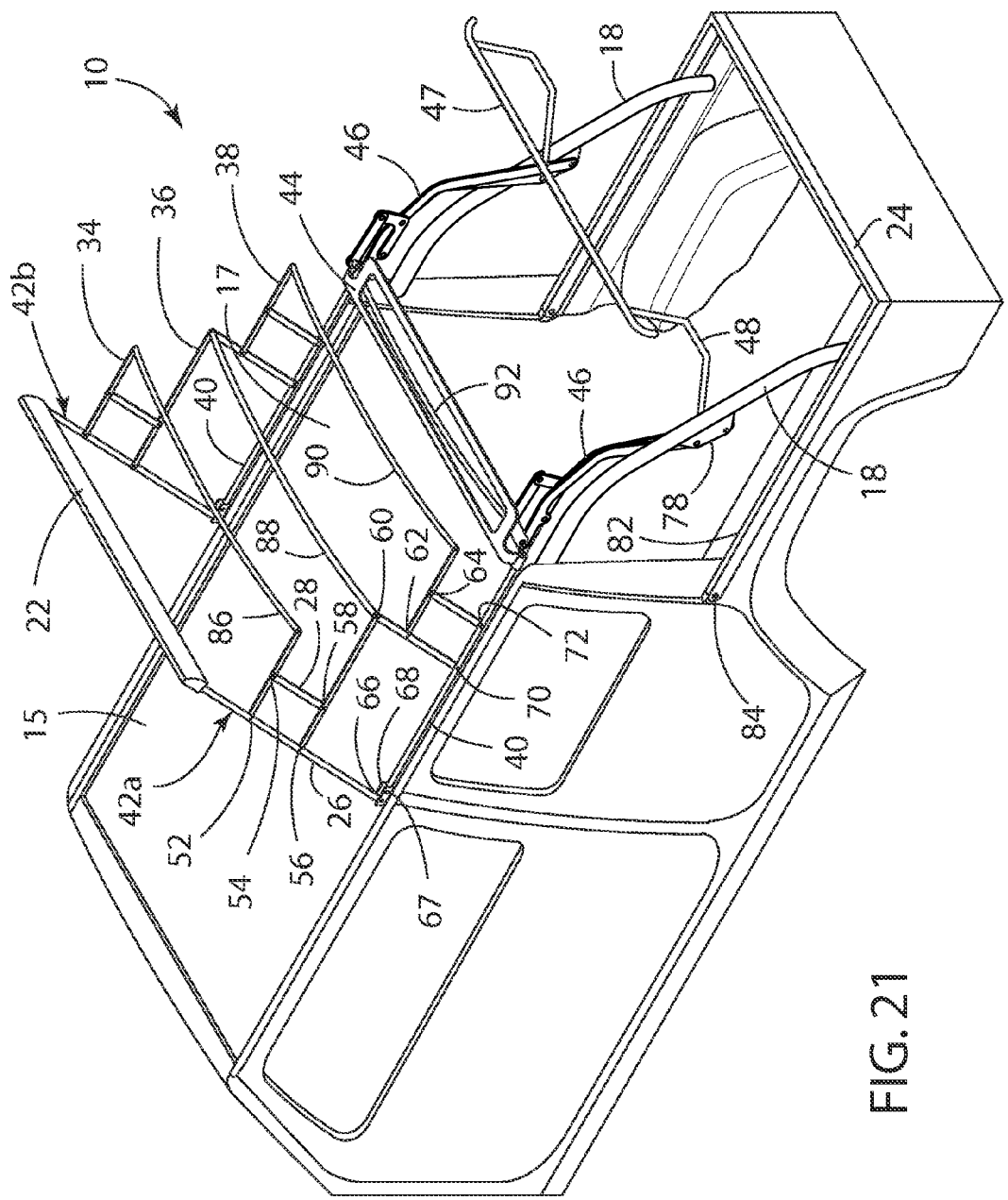
Figure 22:
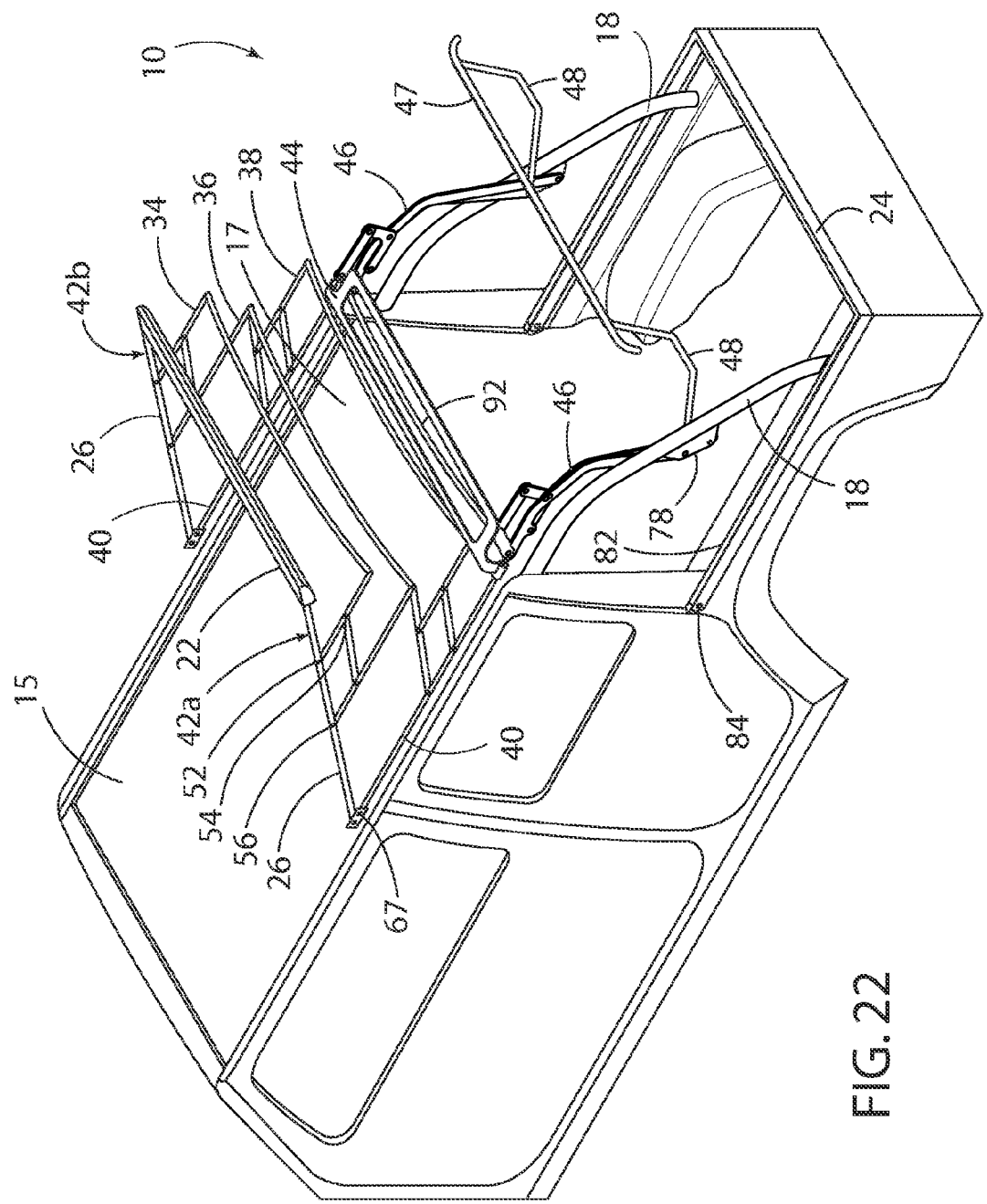
Figure 23:
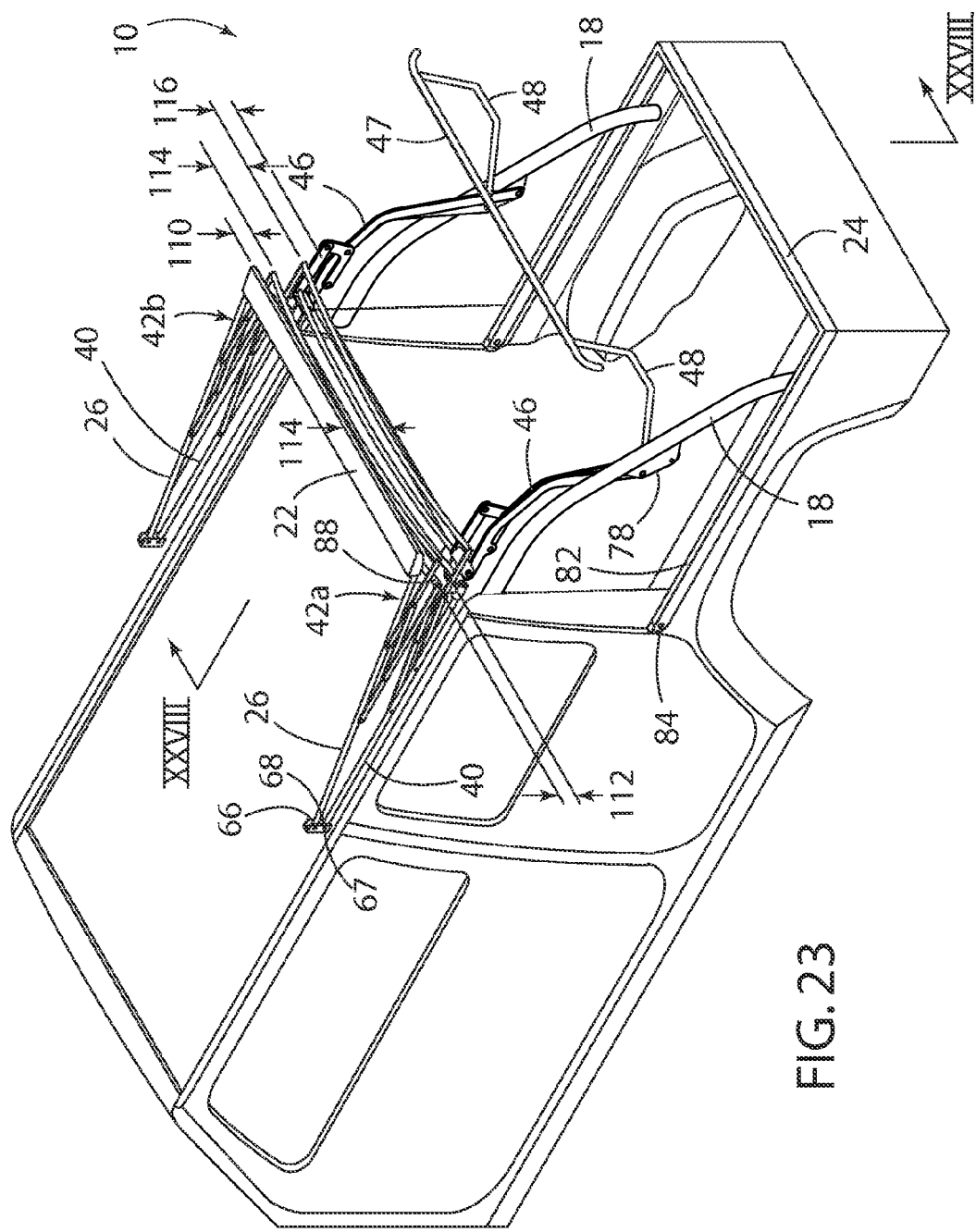
Figure 24:
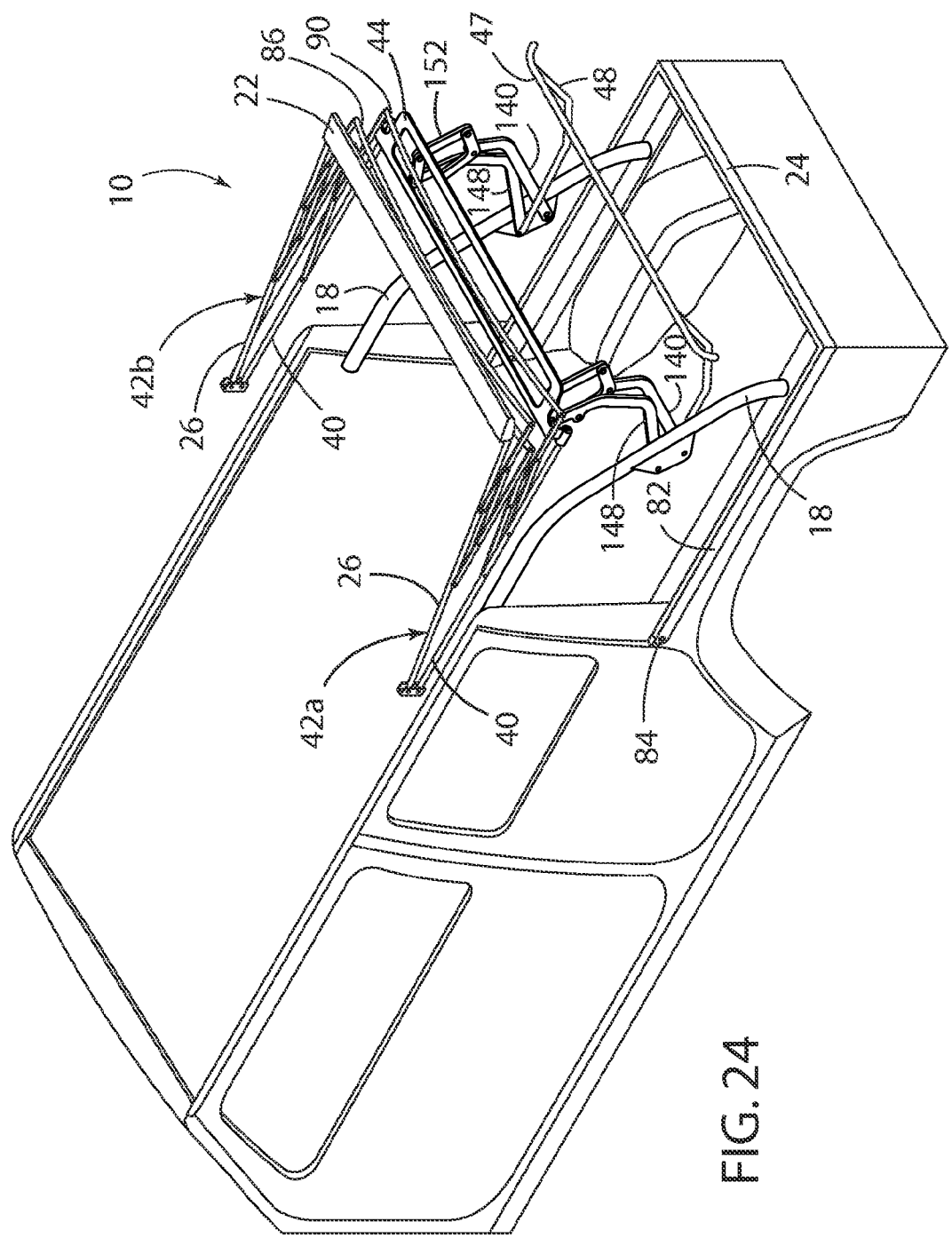
FIGS. 24-26 illustrate perspective views of the portions of the bodywork of the vehicle of FIG. 15 and the framework for the convertible assembly embodiment of FIG. 2 during the second retraction/opening sequence of the entire assembly beginning as shown in FIG. 24 from an extended/closed position shown in FIG. 23 to the second opened/retracted position shown in FIG. 26.
Figure 25:
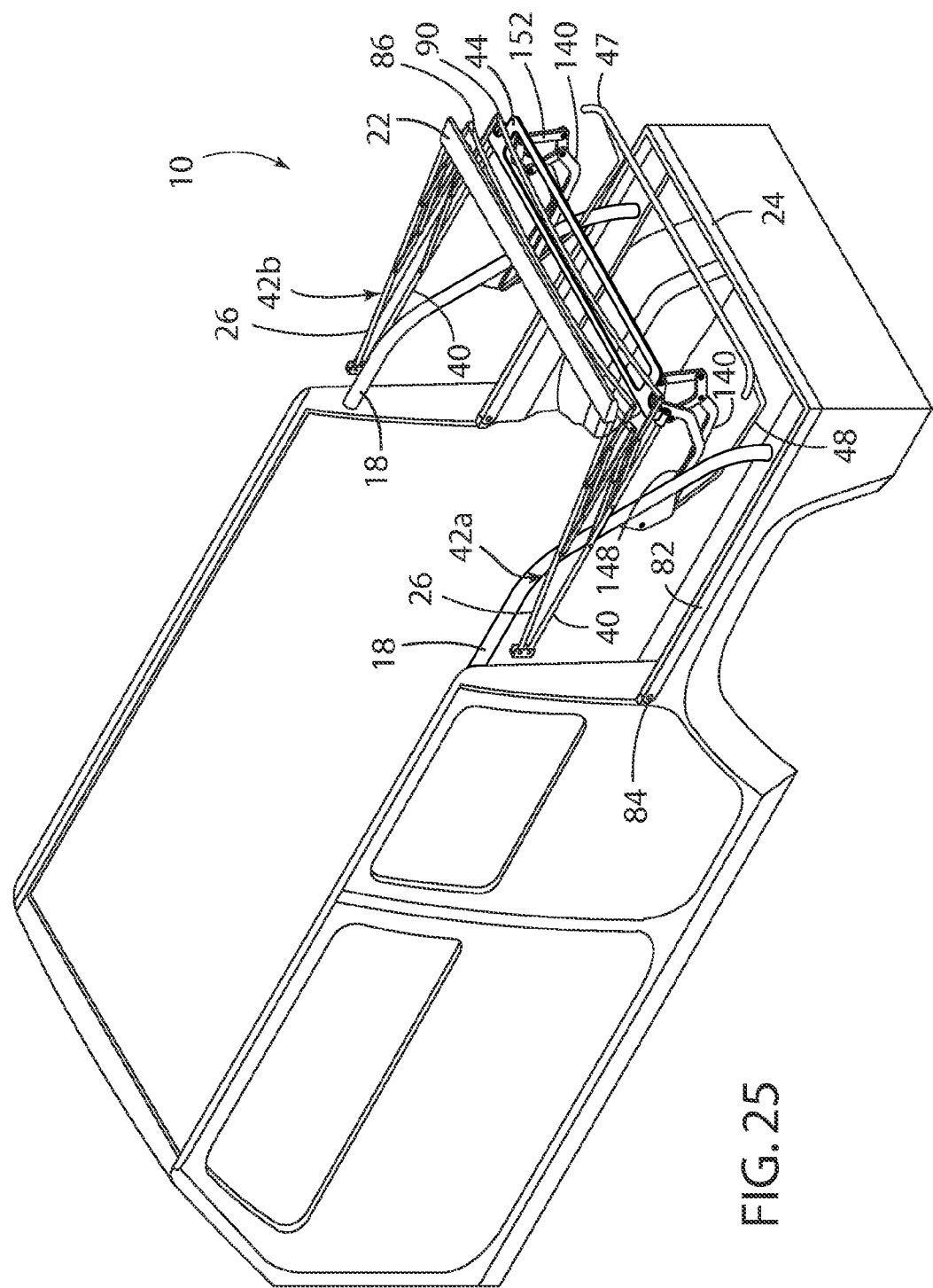

The present embodiments are configured to allow consistent and uniform folding and storage of the soft top fabric 14 of the vehicle 10 while the forward assembly 42 transitions from the extended positions as shown in FIGS. 1 and 18 to the retracted positions such as shown in FIGS. 9 and 23. In a preferred embodiment, this is achieved by spacing the distance between the bows (cordal length) by a predetermined formula. For example, as shown in FIG. 18, the bows 22, 86, 88, 90, 92 may be spaced equidistant from one another. For purposes of illustration, the distances between the bows 22, 86, 88, 90, and 92 can be in the range of about 100 mm to about 500 mm (e.g., 100 mm to 500 mm), preferably about 250 to about 400 mm (e.g., 250 mm to 400 mm), and more preferably, about 346 mm (e.g., 346 mm), as shown in dimensions 100, 102, 104 and 106 on FIG. 18 representing the spacing between forward connector or bow 22 and bow 86, between bow 86 and bow 88, between bow 88 and bow 90 and between bow 90 and bow 92 respectively. It is also noted that for ease of understanding the present embodiments in some of the figures, fabric of the soft top 14 of the vehicle 10 is removed to allow a better view of the forward and aft assemblies 42 and 43.

Using the pivoting configuration for the front assembly 42 as described above, the distance between the bows 22, 86, 88, 90, 92 can provide the desired pull and folds of the fabric of soft top 14 of the vehicle 10. In the extended position of, for example, FIG. 2, the spacing show a symmetrical pull of the fabric, while in a retracted position of, for example, FIG. 9, the spacing shows a symmetric "stacking" of folds of the fabric. Without wishing to be limited by theory, these folds may allow the fabric to be easily extended without residual creasing. Accordingly to one approach, these distances can be calculated by using the formula of $(N_{(A \ldots D)}/2)-K=R$ (where N is the distance between a pair of bows in the extended position, K is a constant, and R is the distance between each the bows in the retracted position). K can be generally about 8 percent to about 14 percent (e.g., 8 percent to 14 percent) of the value of N. Preferably, the constant is a rising constant that increases in an aft-ward longitudinal direction of the vehicle. According to one approach, this value can be from about 8.7 (e.g., 8.7) then stepping up to about 11.6 (e.g., 11.6), then up to about 13 (e.g., 13). One preferred embodiment of the dimensions of the distance between the bows in FIGS. 9 and 23 is shown in the following Table.

TABLE 1

| Distance | N(Extended, FIG. 18) | % of N | $(N_{(A...D)}/2) - K$ | R (Retracted, FIG. 9) |
|---|---|---|---|---|
| A | 346 mm | 8.7 | 346/2 − 30 | 143 mm |
| B | 346 mm | 8.7 | 346/2 − 30 | 143 mm |
| C | 346 mm | 11.6 | 346/2 − 40 | 133 mm |
| D | 346 mm | 13 | 346/2 − 45 | 128 mm |

It is to be appreciated that other configurations are possible within the scope of the present embodiments and the table is presented for exemplary purposes. According to this illustrated formula, the resultant R value, that is the distance between the same bows in a retracted position, is: 143 mm between attachment point 22 and bow 86; 143 mm between bow 86 and bow 88; 133 mm between bow 88 and bow 90; and 128 mm between bow 90 and bow 92. This is illustrated in FIGS. 9 and 23 as spacing 110 between bows 22-86 (retracted); spacing 112 between bows 86-88 (retracted); spacing 114 between bows 88-90 (retracted); and spacing 116 between bows 90-92 (retracted). Corresponding spacing dimensions between the bows in the extended position are depicted in FIG. 18.

Once the forward assembly 42 has been retracted/opened to a first retracted position, such as shown in FIG. 9, aft assembly 43 can initiate a second retraction sequence to fully (or near fully) open the vehicle passenger compartment and even the aft storage compartment 19. For example, in the exemplary embodiment as shown in FIG. 9, retraction of forward assembly 42 only opens the vehicle roof for the forward passenger compartment 15. In one approach, to open the entire vehicle roof (including over rear passenger compartment 17 and aft storage compartment 19), forward assembly 42 is lifted off the vehicle roof by the kinematic action (described below) of aft assembly 43 and lowered in a smooth motion to a stowed position such as shown in FIG. 12. Accordingly, this approach is shown generally in the retraction sequences shown in FIGS. 9-12, and more particularly in FIGS. 28-32. Aft assembly 43 is preferably mounted inboard of the vehicle frame member 18, while forward assembly 42 extends outboard of vehicle frame member 18 since the transverse bows extend outboard of vehicle frame member 18 via, for example, pivotal connection bracket 44 (See, e.g. FIG. 33).

Figure 32:
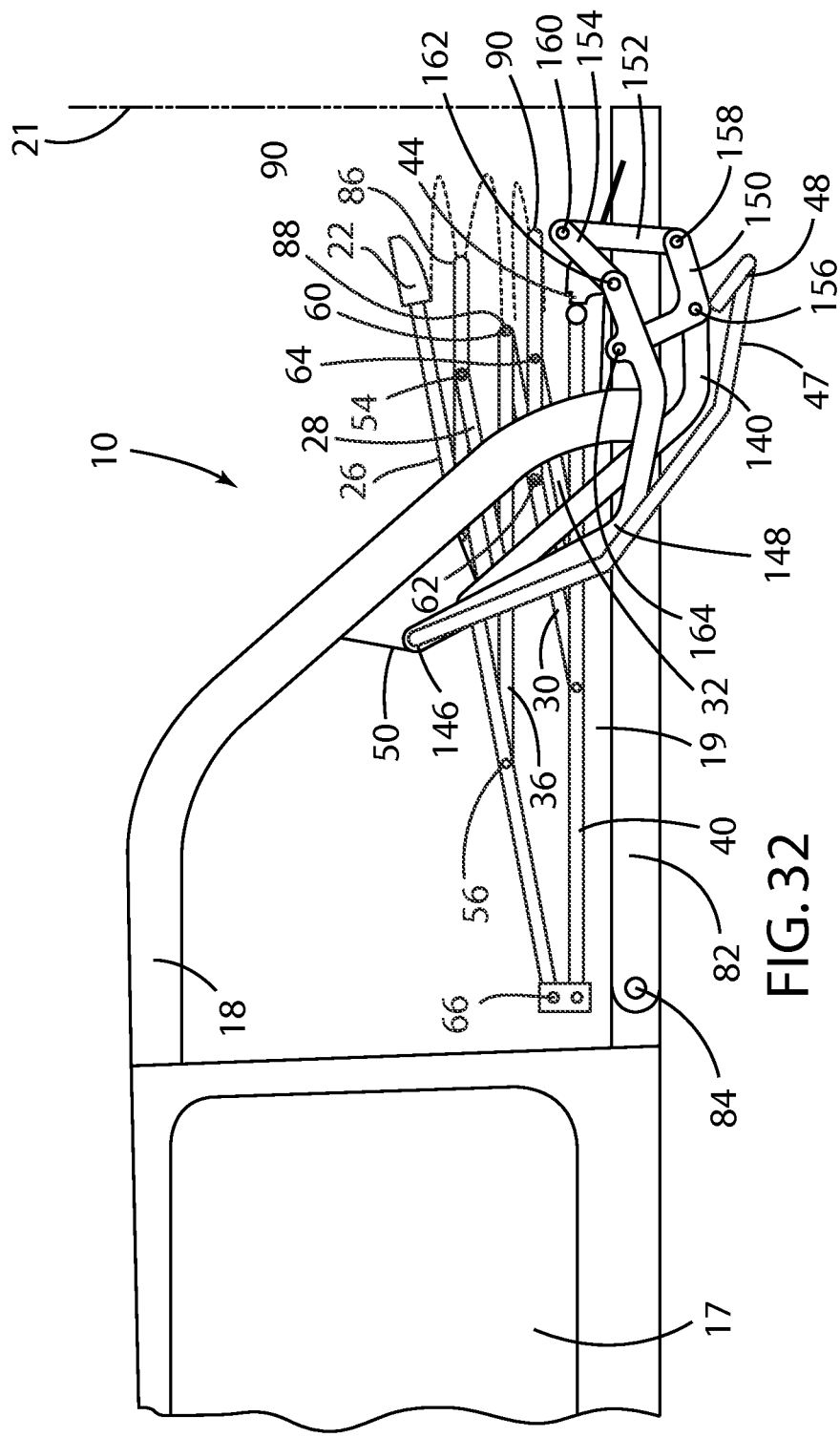

Aft assembly 43 can be configured to follow a variety of positively controlled trajectories, such as to maintain bar 40 in a horizontal (or near horizontal such as a up to a five degree variation from a horizontal position) orientation throughout its travel such as shown in FIG. 10, or in a rearward 'rake' with variation for example up to 45 degrees. In one approach, the travel of the aft assembly 43 is preferably that the distal end of bar 40 does not extend through a vertical plane 21 passing through a rear portion 25 of the vehicle 10, shown in, for example, FIGS. 3 and 10. This configuration allows for an optional mounted spare tire attachment to the rear portion 25 of the vehicle 10 without interrupting and/or obstructing the travel of the convertible forward assembly 42 or aft assembly 43. The travel of aft assembly 43 may be, in one approach, raised above and rotated rearward (while remaining forward of plane 21) before the opening sequence lowers the joined assemblies 42 and 43 to the stowed position, such as shown in FIG. 32. It is also noted that in one preferred embodiment, the linkages (e.g., 148, 150, and 152) provide a positively controlled motion of the forward assembly 42 such that bar 40 of forward assembly 42 is restricted from pivoting freely with respect to aft assembly 43 absent corresponding motion of aft assembly 43. Thus, in such exemplary embodiment, the motion and position retention of forward and aft assemblies 42 and 43 may be controlled during movement of the forward and aft assemblies 42 and 43 from the extended to the stowed position and all points in between. Thus, as used herein 'positive control' means an element or elements moves responsively to the movement of another element or elements. It is also noted that according to one approach movement of aft assembly 43 to the second retracted storage position can only be initiated when forward assembly 42 has reached the first retracted position.

Figure 28:
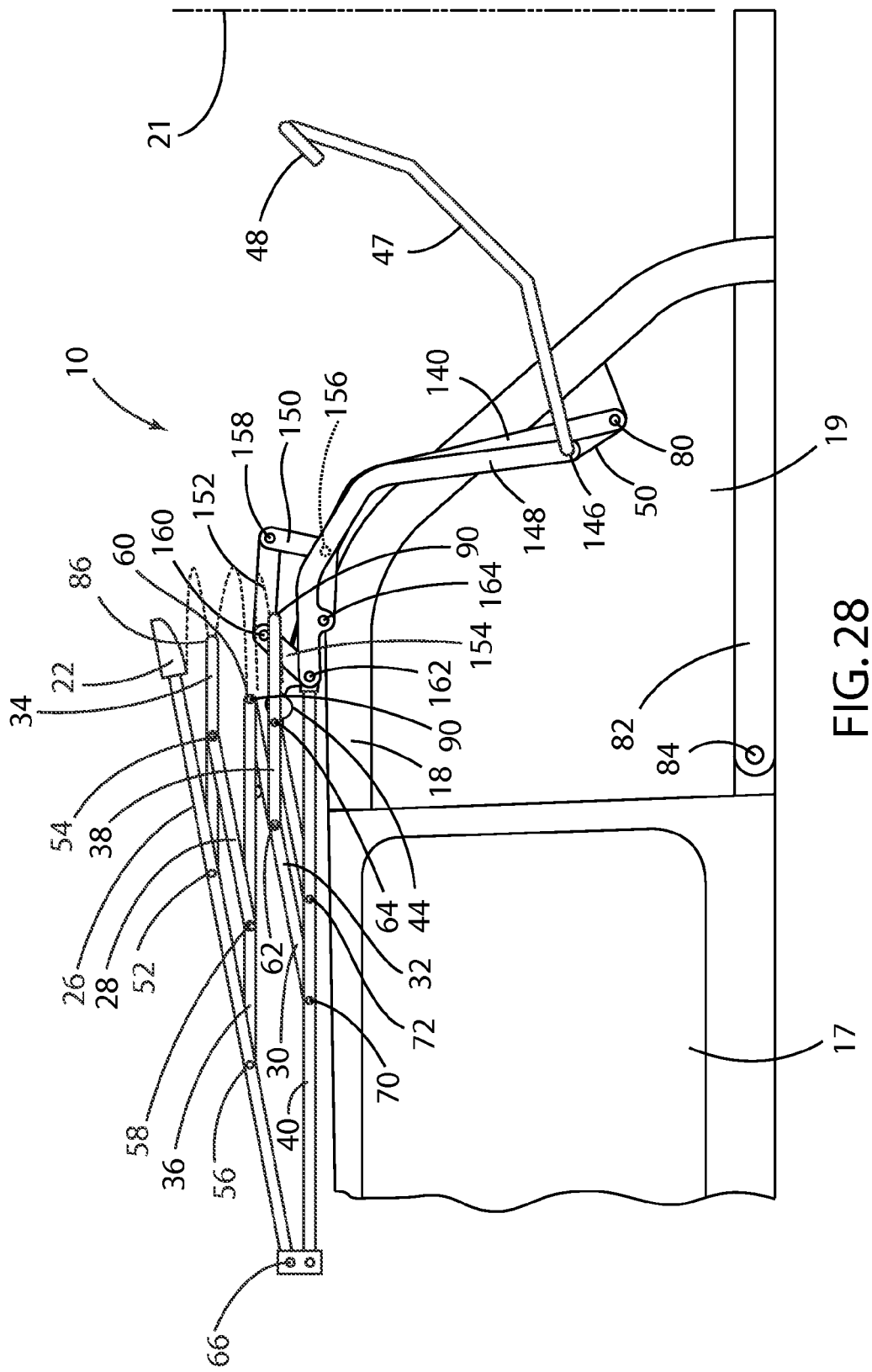
FIGS. 28-32 illustrate enlarged fragmentary side elevation views of the framework for the aft assembly taken along section lines XXVIII-XXVIII of FIG. 23 during a sequence beginning from an first retracted position shown in FIG. 28 to the second retracted position shown in FIG. 32.
Figure 29:
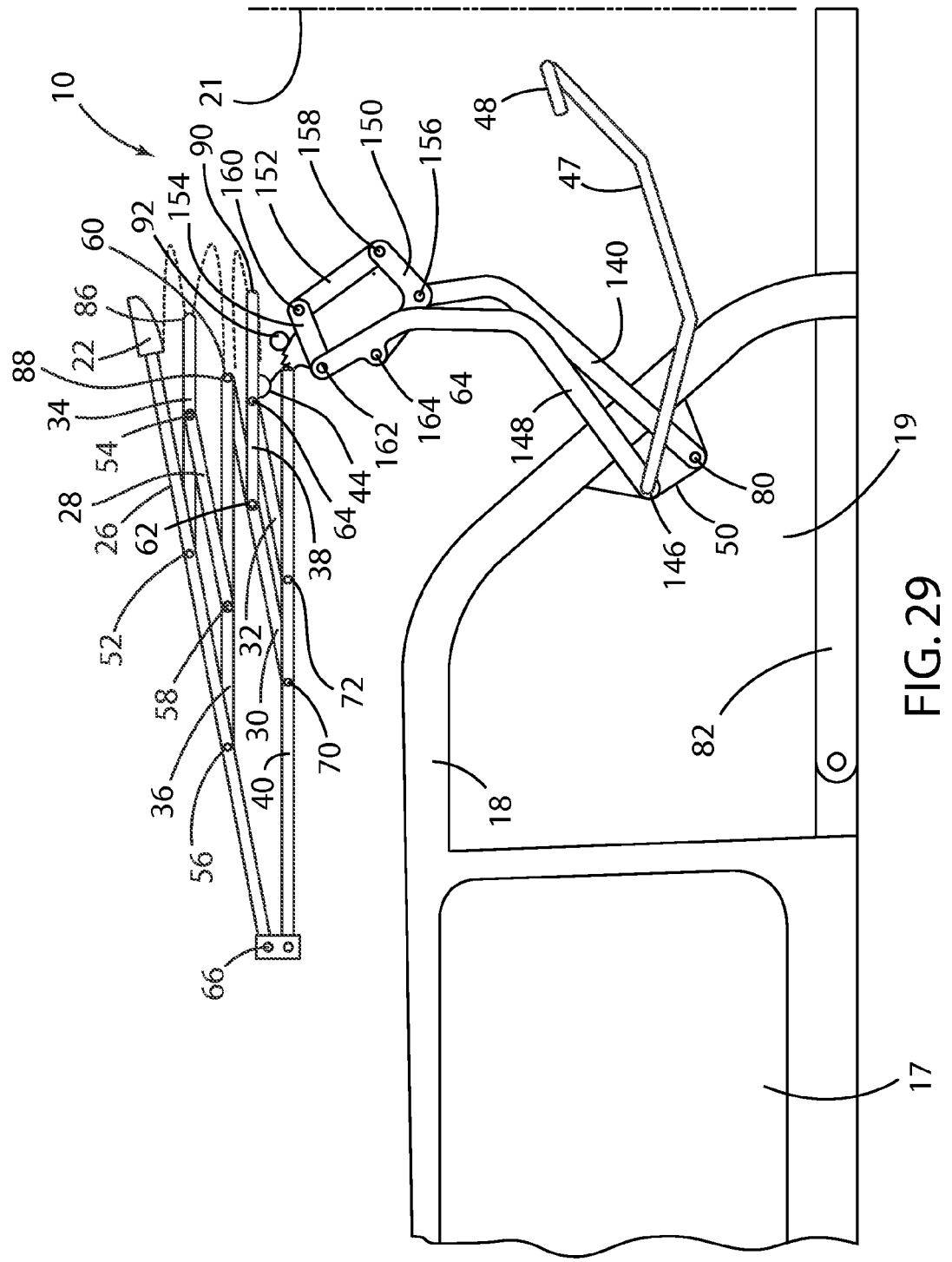
Figure 30:
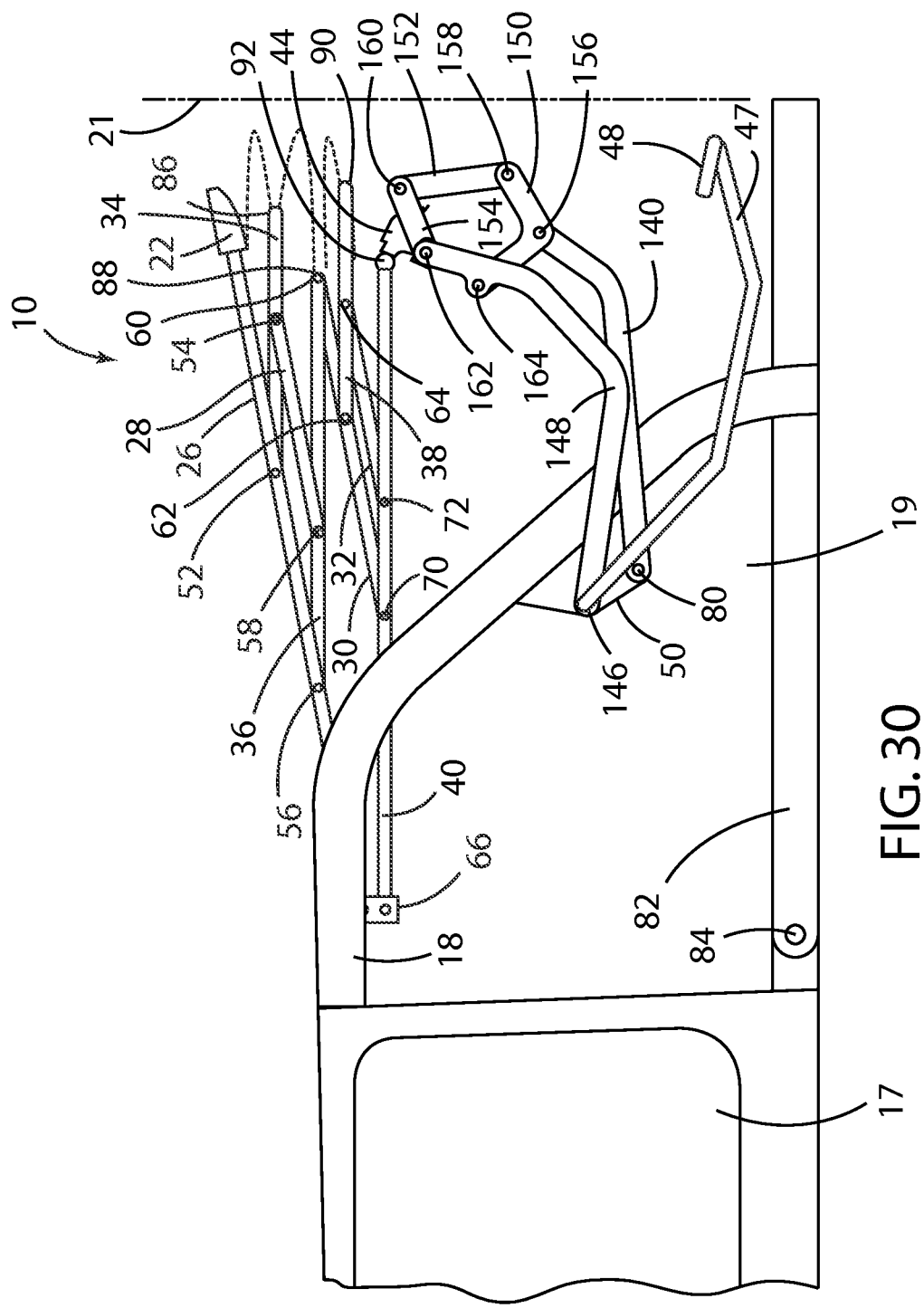
Figure 31:
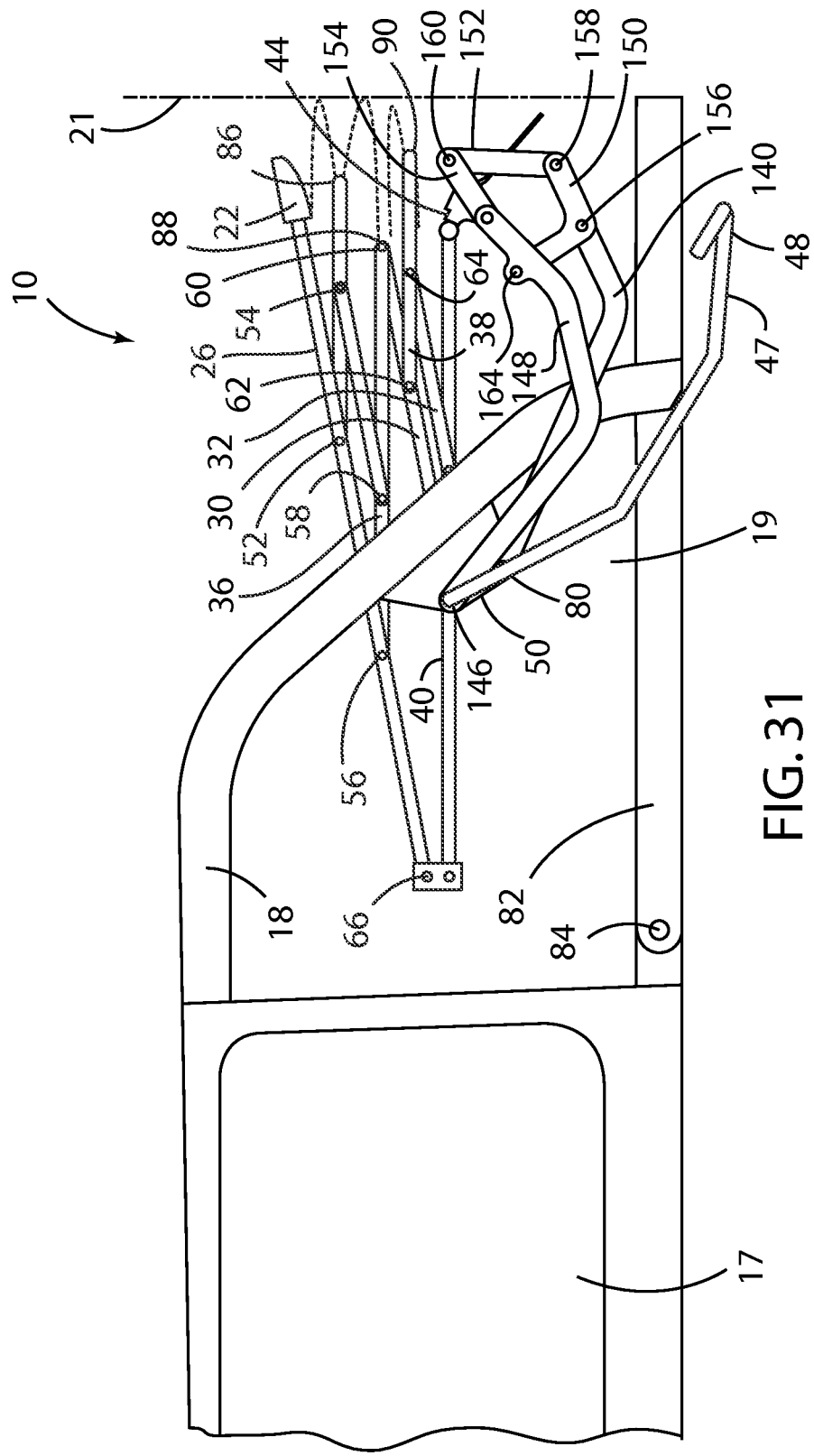
Figure 33:
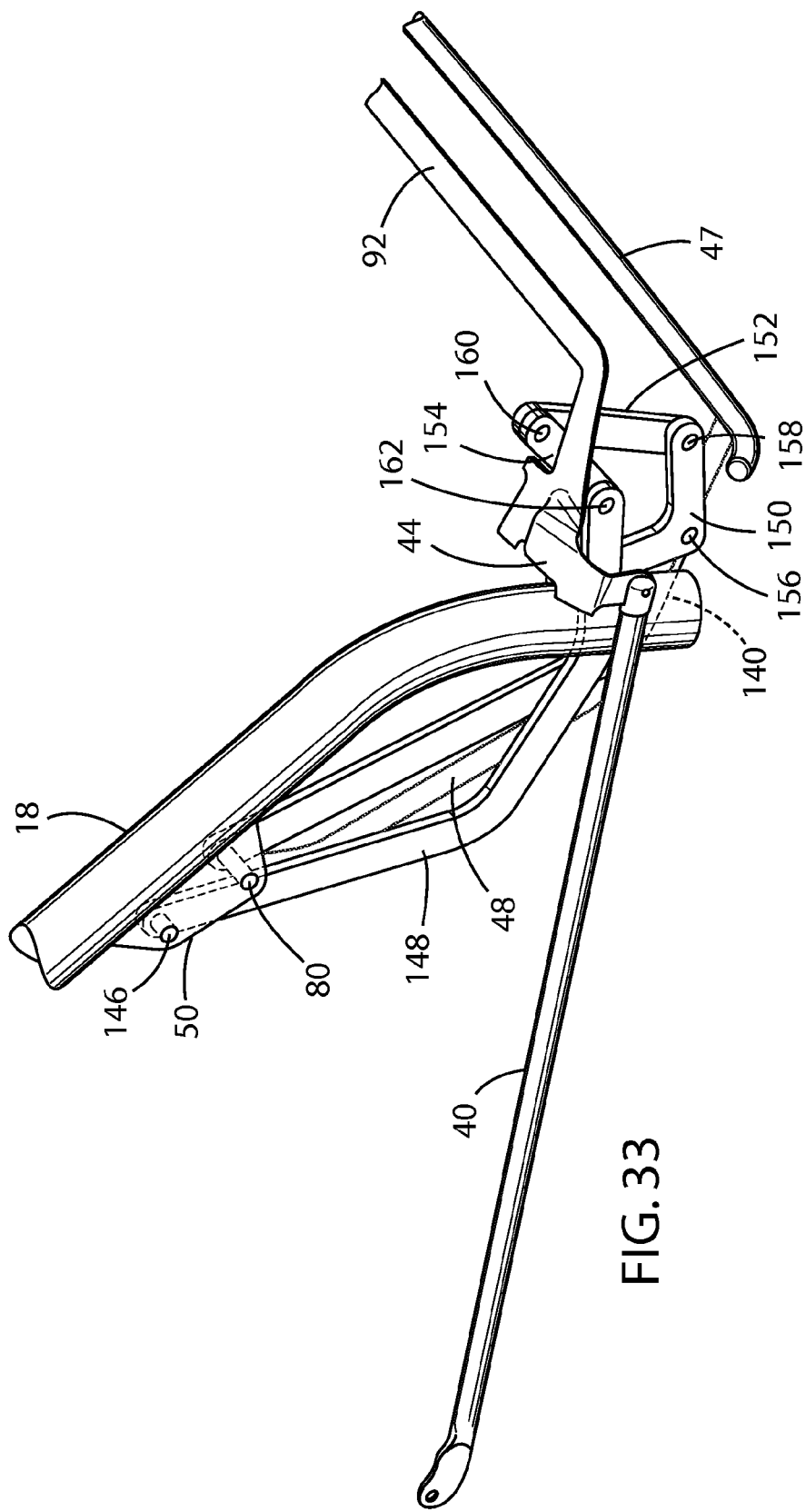
FIG. 33 is a perspective view of an aft assembly on a left side of the vehicle of FIG. 2 in the second retracted position.
Figure 34:
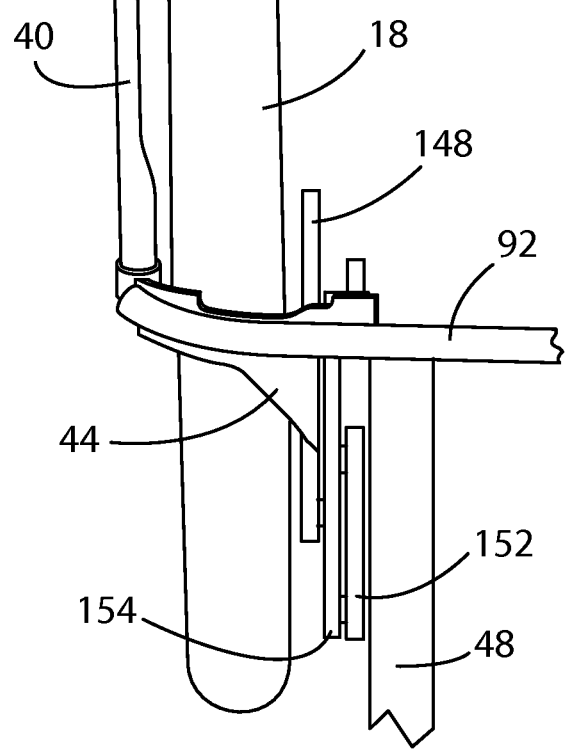
FIG. 34 is a top plan view of the aft assembly on the left side of the vehicle in the second retracted position.

Aft mechanism 43 according to one approach is shown in FIGS. 28-34. In the exemplary embodiment shown in FIGS. 28-34, bar 40 of forward assembly 42 has a bracket 44, which is fixedly attached to transverse bow 92. As shown in FIGS. 33 and 34, bracket 44 extends in an outboard direction to allow attachment of bow 40 in an outboard position of frame member 18. Portion 154 of bar 40 may have pivot points 160 and 162 as shown in, for example, FIG. 28. Pivot point 162 may also provide a pivot point of the distal end of main link 148. Pivot point 160 may also provide a pivot point of a first end of aft link 152. Pivot point 158 may be located at a second end of aft link 152, which also serves as a pivot point of aft link 150, as shown in FIG. 28. Aft link 150 may also pivot with main post bar 140 at pivot point 156 and main aft link 148 at pivot point 164 as shown in FIGS. 28-32.

Both forward and aft assemblies 42 and 43 may be attached to vehicle 10 on the frame member 18 via a main pivot bracket 50. In one approach, main pivot bracket 50 attaches a second end of main link 148 at pivot point 146 and a second end of main post bar 140 at pivot point 80. As shown in FIG. 28, main link 148 and main post bar 140 may be shaped to follow the contours of frame member 18 in the closed/extended position, yet extend beyond frame member 18 in a closed position to allow bow 92 to extend outboard of frame member 18. It is also noted that in one approach, pivot mount 50 may be configured via pivot points 146 or 80 to, for example, also serve as a pivot point for bar 48 so that bar 48 is allowed to descend as aft assembly 43 descends/retracts. As shown in FIGS. 28-32, bar 48 pivot may allow bow 47 to be a 'floating' bow.

Figure 13:
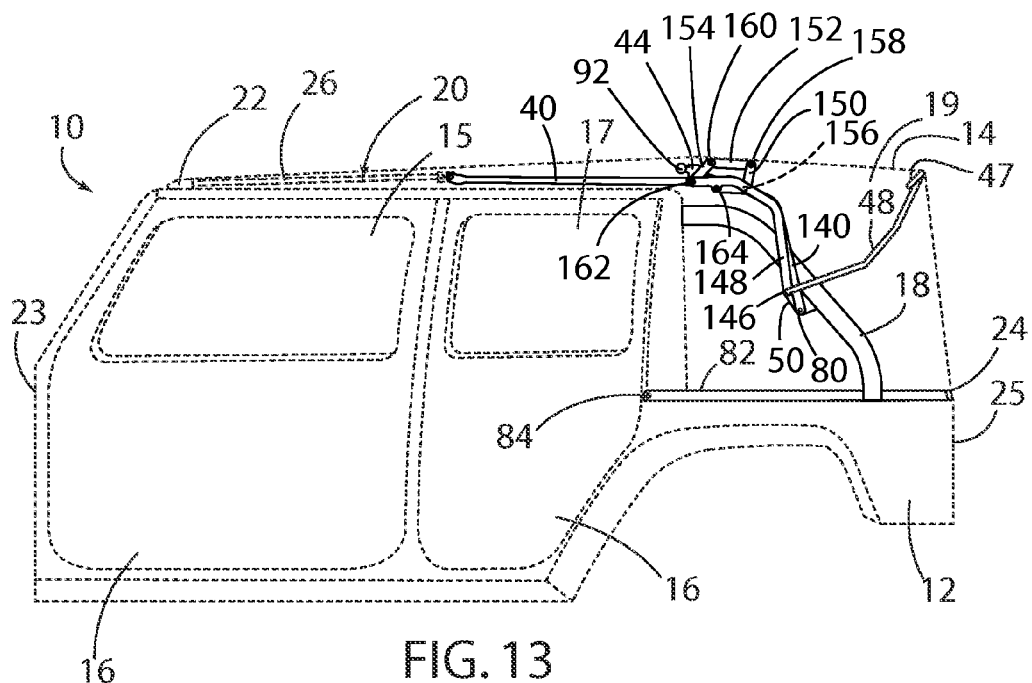
FIGS. 13-14 illustrate a sequence of side sectional views of the framework of FIG. 2 during a third retraction sequence of hatch bar 82 from a closed position shown in FIG. 13 to an open position shown in FIG. 14.
Figure 14:
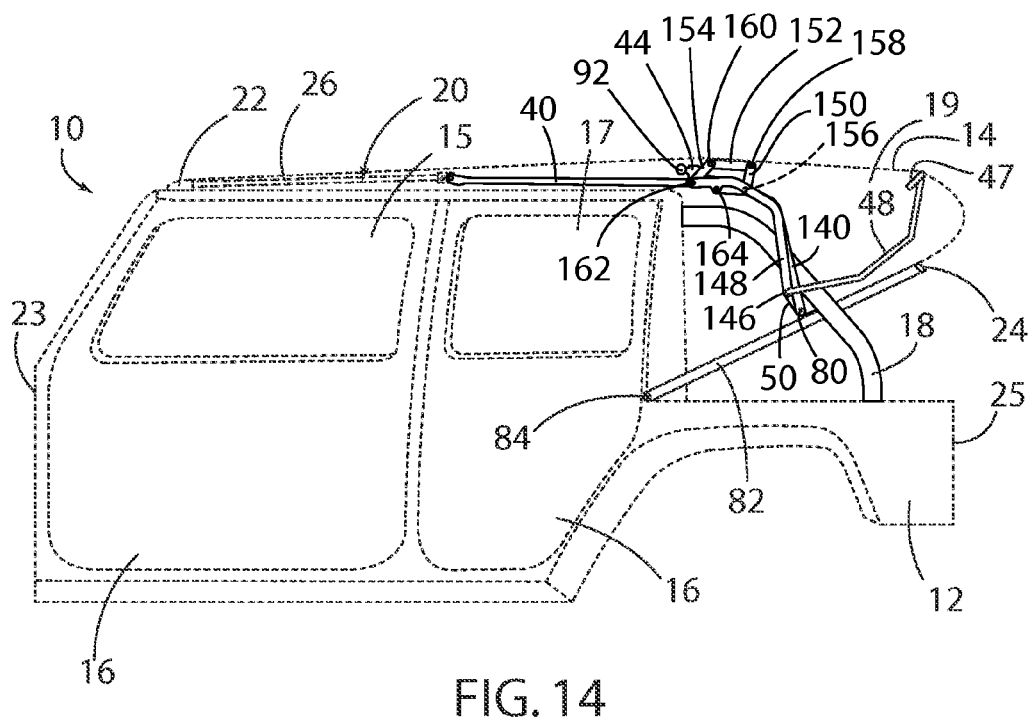
Figure 15:
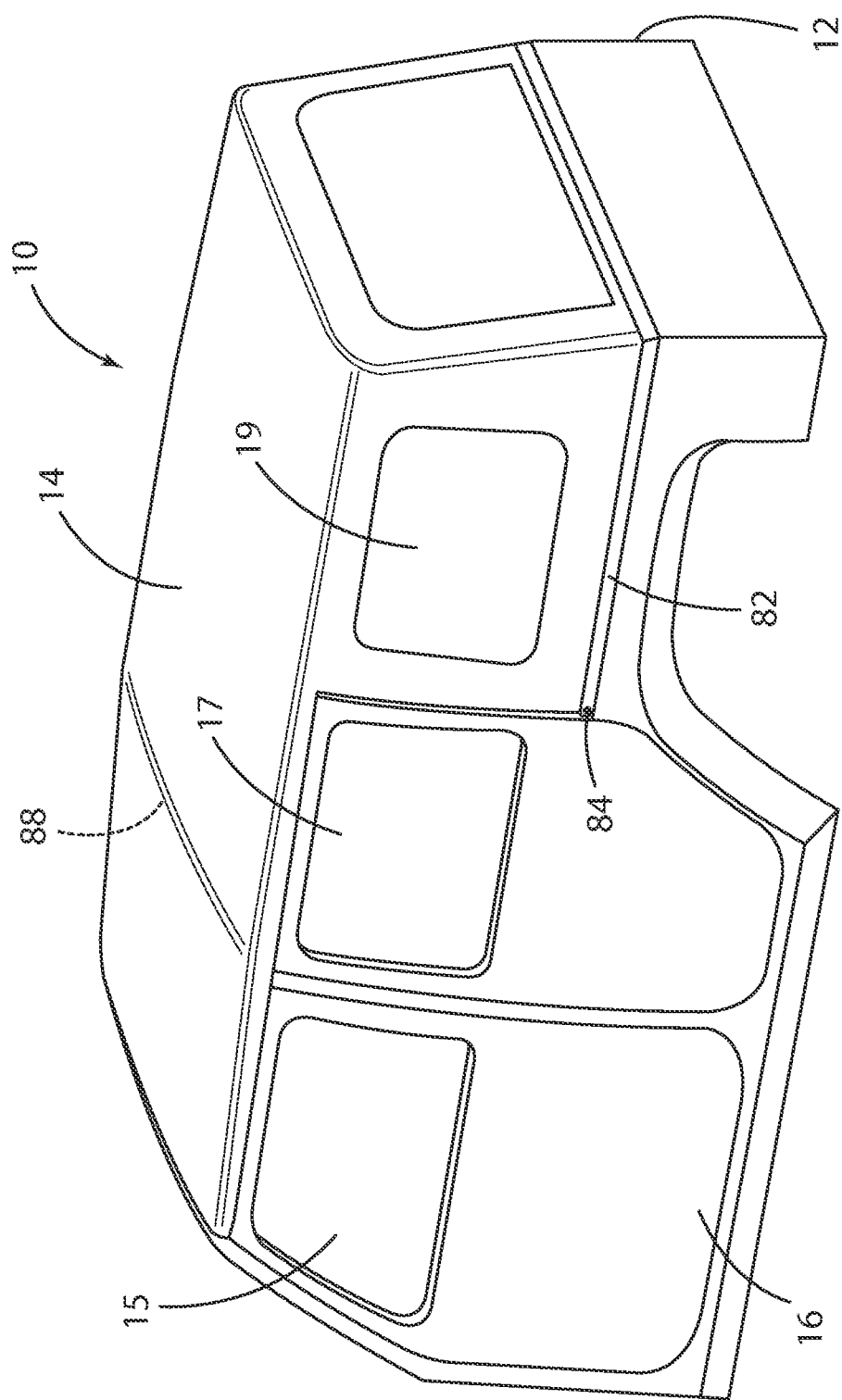
FIG. 15 illustrates a perspective view of portions of bodywork of an exemplary vehicle having a soft top.
Figure 16:
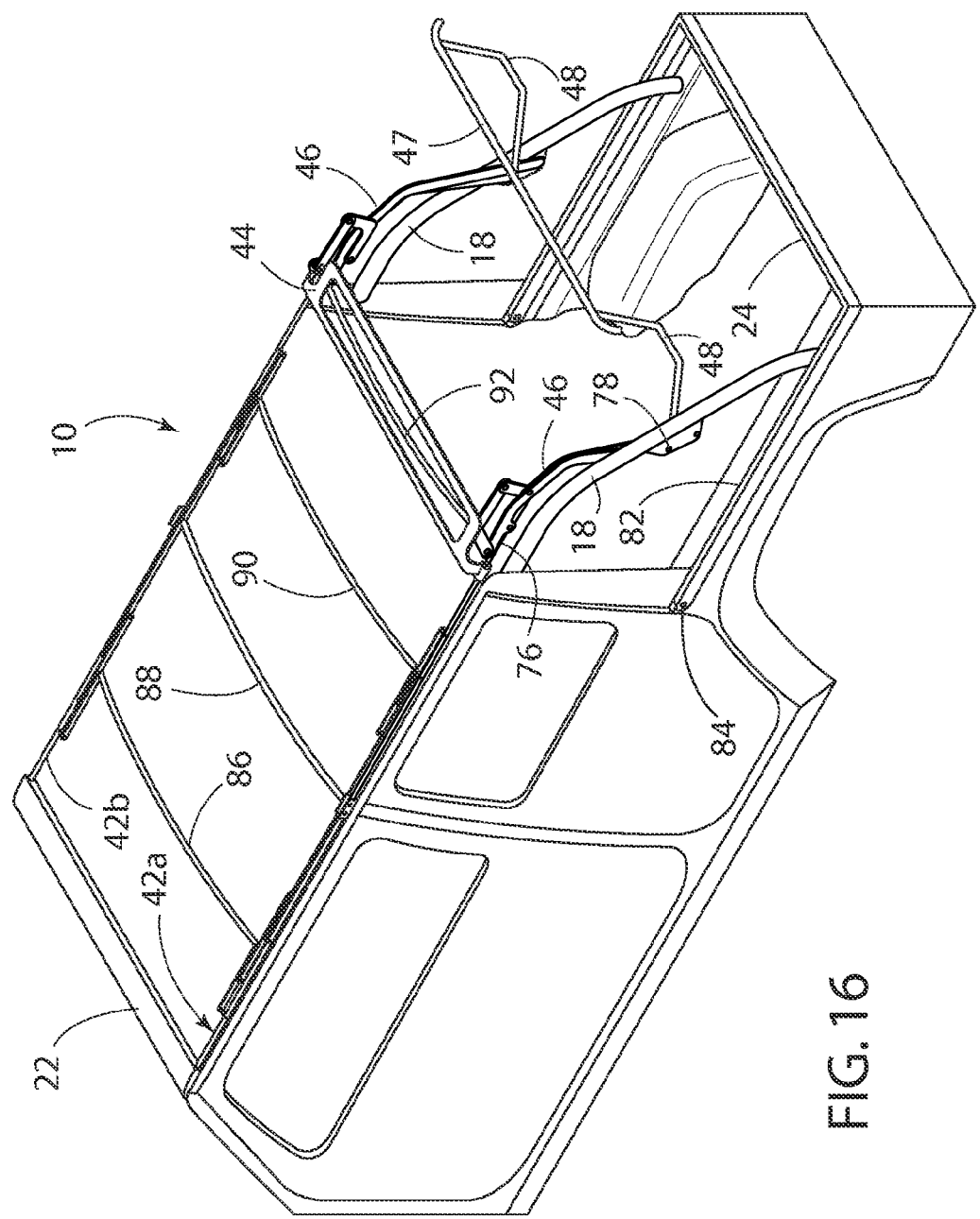
FIGS. 16-18 illustrate a sequence of perspective views of a convertible frame assembly of the vehicle of FIG. 15 showing a hatch portion starting at a closed position shown in FIG. 16, to an open position shown in FIG. 17, and back to a closed position shown in FIG. 18 according to one embodiment.
Figure 17:
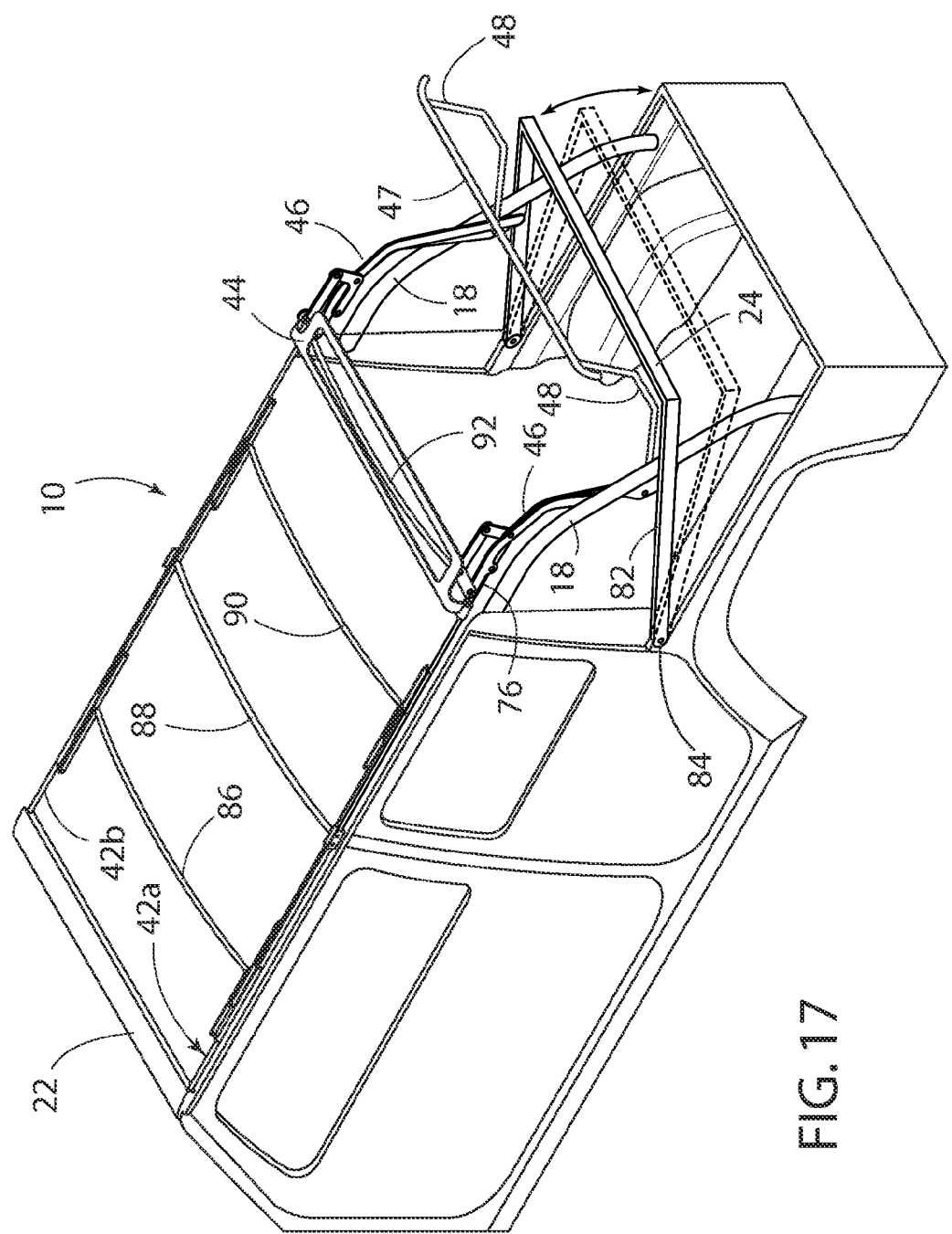

Optionally, as a third retracted position of present assemblies, at an aft end 25 of the vehicle 10, the convertible soft top assembly can be configured to include an upwardly opening hatch or bar 82. For example, as shown in FIGS. 13-14, and 17, bar 82 can be raised from a closed position (e.g., FIGS. 19 and 20) by a pivot 84 to an open position (e.g., FIG. 17) to allow a user access to a rear storage compartment at an aft end 25 of the vehicle 10 while the convertible soft top 14 assembly is extended to its closed position. Optionally, the aft assembly 43 can be configured to also raise bar 48 of the aft assembly as bar 82 is raised from the closed position to the open position. As presented in the illustrated embodiments, since bow 47 is a floating bow, it too can be raised with bar 82 as tension from the soft top 14 is released as bar 82 rises.

While preferred embodiments have been described in detail, variations and modifications can be effected within the scope of the present embodiments.

The invention claimed is:

1. A convertible top for a vehicle having longitudinal vehicle frame members on both vehicle sides, comprising:
a convertible top assembly having a link arrangement pivotally mounted on each longitudinal frame member,
each link arrangement having a forward assembly pivotally mounted to an aft assembly, the aft assembly pivotally mounted to the longitudinal vehicle frame members;
each forward assembly having a forward base bar pivotally mounted to a forward second bar to permit movement of a portion of the convertible top from a closed position to a first retracted position, the forward second bar being configured to fold over the forward base bar;
each aft assembly having a first pivotal mount to the forward base bar and a second pivotal mount to the longitudinal vehicle frame members, wherein the first and second pivotal mounts permit movement of the link arrangements from the first retracted position toward a lowered storage position;
wherein the first pivotal mount and the second pivotal mount each comprise joint arrangements to couple the forward and aft assemblies to the longitudinal vehicle frame members; and
wherein each forward assembly includes eight bars pivotally connected by ten pivot points.

2. The convertible top of claim 1, wherein the link arrangements are connected by at least one tensioning bow.

3. The convertible top of claim 1, wherein the forward assembly base bar is stationary during the movement of the convertible top from the closed position toward the first retracted position; and
wherein the link arrangements controllably rotate from the first retracted position to the lowered storage position without extending beyond a vertical plane passing through a rear portion of the vehicle.

4. The convertible top of claim 3, wherein the forward assembly base bar is configured to travel up to a five degree variation from a horizontal position while the link arrangements controllably rotate from the first retracted position to the lowered storage position.

5. The convertible top of claim 2, further comprising a floating tensioning bow disposed between a forward assembly tensioning bow and an aft end of the convertible top.

6. A convertible top for a vehicle having longitudinal vehicle frame members on both vehicle sides, comprising:
a convertible top assembly having a link arrangement pivotally mounted on each longitudinal frame member,
each link arrangement having a forward assembly pivotally mounted to an aft assembly, the aft assembly pivotally mounted to the longitudinal vehicle frame members;
each forward assembly having a forward base bar pivotally mounted to a forward second bar to permit movement of a portion of the convertible top from a closed position to a first retracted position, the forward second bar being configured to fold over the forward base bar;
each aft assembly having a first pivotal mount to the forward base bar and a second pivotal mount to the longitudinal vehicle frame members, wherein the first and second pivotal mounts permit movement of the link arrangements from the first retracted position toward a lowered storage position;
wherein the first pivotal mount and the second pivotal mount each comprise joint arrangements to couple the forward and aft assemblies to the longitudinal vehicle frame members; and
wherein the joint arrangements of the first and second pivotal mounts of the aft assembly each have first and second aft bars between the first pivotal mount and the second pivotal mount coupled to three linked control bars and seven pivot points.

7. The convertible top of claim 1, wherein the pivot points are configured so that four of the bars are substantially parallel to each other and four bars are substantially parallel to each other during the movement of the convertible top from the closed position toward the first retracted position.

8. The convertible top of claim 1, wherein each forward assembly is configured to pivot at least 160 degrees during the movement of the convertible top from the closed position toward the first retracted position.

9. The convertible top of claim 1, wherein each of the forward base bars includes a distal end including a pivot point removably attached to a forward edge of a vehicle roof opening, wherein the distal end of each of the forward base bars is connected by a forward connector.

10. A convertible top for a vehicle having longitudinal vehicle frame members on both vehicle sides, comprising:
a convertible top assembly having a link arrangement pivotally mounted on each longitudinal frame member;
each link arrangement having a forward assembly pivotally mounted to an aft assembly, the aft assembly pivotally mounted to the longitudinal vehicle frame members;
each forward assembly having a forward base bar pivotally mounted to a forward second bar to permit movement of a portion of the convertible top from a closed position to a first retracted position, the forward second bar being configured to fold over the forward base bar;
each aft assembly having a first pivotal mount to the forward base bar and a second pivotal mount to the longitudinal vehicle frame members, wherein the first and second pivotal mounts permit movement of the link arrangements from the first retracted position toward a lowered storage position;
wherein the first pivotal mount and the second pivotal mount each comprise joint arrangements to couple the forward and aft assemblies to the longitudinal vehicle frame members; and
wherein the forward assembly further comprises a plurality of transverse tensioning bows, wherein a distance between each of the plurality of transverse tensioning bows of the forward assembly in the first retracted position is configured according to a formula of $(N_{(A...D)}/2) - K$, where N is a distance between a pair of the transverse tensioning bows in the closed position and K is a constant.

11. The convertible top of claim 10, wherein K is 8 to 14 percent of the value of N.

12. The convertible top of claim 10, wherein K is a rising constant that increases in an aft-ward longitudinal direction of the vehicle.

13. The convertible top of claim 5, wherein the aft end of the convertible top further comprises a hatch bow pivotally mounted to and adjacent to an aft rear sill of the vehicle.

14. A method of opening a convertible top for a vehicle having longitudinal vehicle frame members on two opposite sides of the vehicle, a link arrangement pivotally mounted on each of the longitudinal frame members, each link arrangement having a forward assembly pivotally mounted to an aft assembly, the aft assembly pivotally mounted to the longitudinal vehicle frame members; each forward assembly having a forward base bar pivotally mounted to a forward second bar, each aft assembly having a first pivotal mount to the forward base bar and a second pivotal mount to the longitudinal vehicle frame members, and wherein the first pivotal mount and second pivotal mount each comprise joint arrangements to couple the forward and aft assemblies to respective longitudinal vehicle frame members, the method comprising:

folding the forward second bar over the forward base bar to adjust a portion of the convertible top between a closed position to a first retracted position;

retracting the link arrangements from the first retracted position toward a lowered storage position; and raising a hatch bow pivotally mounted to and adjacent to an aft rear sill of the vehicle.

15. The method of claim 14, further comprising moving at least one bar of the forward assembly by at least 160 degrees during the retracting of the link arrangements from the closed position toward the first retracted position.

16. A convertible assembly for a vehicle having a soft top roof, a forward end, and an aft end, the convertible assembly comprising:

a forward roof assembly and an aft roof assembly pivotably attached to opposite longitudinal vehicle frame members;

the forward roof assembly movable between a closed position which covers at least a portion of an interior of the vehicle and a retracted position which exposes at least a portion of the interior of the vehicle;

the forward roof assembly including a pair of reciprocal pivoting armatures extending longitudinally along at least a portion of the longitudinal vehicle frame members, the armatures connected by a plurality of transverse tensioning bows, at least a first bar of the forward roof assembly having an extended position and attachable to a portion of the vehicle when in the extended position;

the aft roof assembly pivotably attached to the forward roof assembly at a forward end of the aft roof assembly and pivotably attached to the longitudinal frame members at an aft end of the aft roof assembly, the aft roof assembly movable between a closed position which covers at least a portion of the interior of the vehicle and a retracted position which exposes the interior of the vehicle;

the aft roof assembly including a pair of reciprocal pivoting armatures extending longitudinally along a length of a portion of at least a portion of the longitudinal vehicle frame members; and wherein a distance between each of the plurality of transverse tensioning bows of the forward assembly in the first retracted position is configured according to a formula of $(N_{(A \ldots D)}/2) - K$, where N is a distance between a pair of the transverse tensioning bows in the closed position and K is a constant.

17. The convertible assembly of claim 16, wherein the forward roof assembly is configured to pivot at least 160 degrees during the movement of the forward roof assembly from the closed position toward the first retracted position.

* * * * *